United States Patent
Garbos et al.

(10) Patent No.: US 12,322,215 B2
(45) Date of Patent: *Jun. 3, 2025

(54) ACTIVATABLE POSTAGE

(71) Applicant: HALLMARK CARDS, INCORPORATED, Kansas City, MO (US)

(72) Inventors: Jennifer Richards Garbos, Kansas City, MO (US); Stephanie Farris Young, Overland Park, KS (US); Jeanette B. Raven, Lenexa, KS (US); Scott Schimke, Leavenworth, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,671

(22) Filed: Jun. 11, 2024

(65) Prior Publication Data

US 2024/0331452 A1  Oct. 3, 2024

Related U.S. Application Data

(63) Continuation of application No. 16/215,140, filed on Dec. 10, 2018, now Pat. No. 12,039,809.

(Continued)

(51) Int. Cl.
*G07B 17/00* (2006.01)

(52) U.S. Cl.
CPC . *G07B 17/00435* (2013.01); *G07B 17/00016* (2013.01); *G07B 17/00661* (2013.01);

(Continued)

(58) Field of Classification Search
CPC ...... G07B 2017/0037; G07B 17/00508; G07B 17/00435; G07B 2017/00588;
(Continued)

(56) References Cited

U.S. PATENT DOCUMENTS 9,208,620 B1 * 12/2015 Bortnak ............. G07B 17/0008
9,805,329 B1 * 10/2017 Biswas ............. G06Q 10/0832
(Continued)

OTHER PUBLICATIONS

Disclosed Anonymously, "A Method of Uniquely Identifying Postal Items," IP.com IPCOM000206366D, dated Apr. 20, 2011, pp. 1-4 (Year: 2011).*

*Primary Examiner* — Michael P Harrington
(74) *Attorney, Agent, or Firm* — Practus, LLP; Jesse J. Camacho

(57) ABSTRACT

Aspects of the technology described herein provide an activatable postage. The activatable postage is printed on a media, such as an envelope or sticker. Initially, the activatable postage has no postage value and may not have any value until activated. Each instance of activatable postage can include a unique identifier encoded in a machine-readable format. Postage value is added to the activatable postage through an activation process. To activate an individual instance of activatable postage, the unique identifier encoded in the activatable postage needs to be provided to the activation application. At the end of the activation process, a central database is updated to associate the unique identifier with a postal value calculated during activation. When the Postal Service receives an item with activatable postage it validates the activatable postage and then deactivates the activatable postage by updating the central database.

20 Claims, 24 Drawing Sheets

Related U.S. Application Data

(60) Provisional application No. 62/597,381, filed on Dec. 11, 2017.

(52) U.S. Cl.
CPC ............... *G07B 17/00733* (2013.01); *G07B 2017/0037* (2013.01); *G07B 2017/00443* (2013.01); *G07B 17/00508* (2013.01); *G07B 2017/00588* (2013.01); *G07B 2017/0062* (2013.01); *G07B 2017/00717* (2013.01); *G07B 2017/00725* (2013.01); *G07B 2017/0083* (2013.01)

(58) Field of Classification Search
CPC .... G07B 2017/00717; G07B 17/00362; G07B 2017/0083; G07B 17/00016; G07B 2017/0062; G07B 2017/00064; G07B 2017/00709; G07B 2017/00096; G06Q 10/083; G06Q 2250/00; G06Q 2250/90
See application file for complete search history.

(56) References Cited

U.S. PATENT DOCUMENTS

| | | | |
|---|---|---|---|
| 10,181,110 B1* | 1/2019 | Atkinson | G06F 40/174 |
| 10,713,634 B1* | 7/2020 | McBride | G06Q 20/38215 |
| 2003/0074435 A1* | 4/2003 | Hobbs | G07F 15/12 |
| | | | 709/223 |
| 2005/0216319 A1* | 9/2005 | Reblin | G06Q 10/025 |
| | | | 705/6 |
| 2010/0332415 A1* | 12/2010 | Sievel | G07B 17/00508 |
| | | | 707/769 |
| 2011/0113478 A1* | 5/2011 | Chatte | G07B 17/0008 |
| | | | 726/7 |
| 2015/0254630 A1* | 9/2015 | Royyuru | G06Q 20/327 |
| | | | 705/39 |
| 2016/0098755 A1* | 4/2016 | Silvestro | G06Q 30/0258 |
| | | | 705/14.58 |
| 2017/0046605 A1* | 2/2017 | Asthana | G06K 7/1417 |

\* cited by examiner

FIG. 2

ACTIVATABLE POSTAGE

CROSS-REFERENCE TO RELATED APPLICATIONS

This application is a Continuation Application of U.S. application Ser. No. 16/215,140 (filed on Dec. 10, 2018 and entitled "ACTIVATABLE POSTAGE), which claims the benefit of priority to U.S. Provisional Application No. 62/597,381 (filed on Dec. 11, 2017 and entitled "SCAN AND SEND POSTAGE ALTERNATIVE AND RELATIONSHIP APP"). All the aforementioned applications are hereby incorporated by reference for all purposes. This application likewise claims the benefit of U.S. Provisional Application No. 62/597,381.

BACKGROUND

Postage can be added to an item, such as a letter or package, in a number of different ways. The United States Postal Service (USPS) sells fixed value stamps that may be adhered to an envelope. Franking machines can print postage directly onto an envelope. Customers can go to a kiosk at a post office or other location and receive the correct postage for a package by weighing the package and providing a destination. In these examples, the postage indication, such as a stamp, has a fixed value when printed.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide an activatable postage. The activatable postage has several advantages over pre-printed postage stamps and on-demand printed postage that is used today, including improved fraud prevention. The activatable postage described herein is less susceptible to fraud, especially forgery, than current postage for at least two reasons. First, each instance of the activatable postage has a unique appearance, in contrast to stamps, which have millions of instances of the exact same stamp. Second, validation of the activatable postage requires a postage value to be associated with an individual instance of activatable postage in a central database. Thus, forging an instance of activatable postage requires a forger to both reproduce the appearance of the activatable postage and hack a database to add a postage value to an identifier that is machine coded within the activatable postage.

As an initial step, the activatable postage is printed on a media, such as an envelope or sticker. Initially, the activatable postage has no postage value and will not have any value until activated. Each instance of activatable postage comprises a unique identifier encoded in a machine-readable format. The unique identifier may be a string of numbers, letters, a combination of numbers and letters, or some other unique identifier. The unique identifier may be long enough to provide trillions of different unique combinations.

Postage value is added to the activatable postage through an activation process. The activation process utilizes a computer application running on a computing device. In one aspect, the computing device is a user device such as a smart phone, PC, or tablet. In another aspect, the computing device is a kiosk provided in a public location such as a post office or store.

In order to activate an individual instance of activatable postage, the unique identifier encoded in the activatable postage needs to be provided to the activation application. In one aspect, the unique identifier is retrieved by scanning the activatable postage. Once the unique identifier is obtained from the individual instance of activatable postage, the user can provide information about the item to be posted. The information can include a size and weight of the item. The user may also be asked to provide a destination address and/or zip code.

Once the item information is provided, the postage rate is calculated. The user may be asked to confirm the amount or authorize payment in the amount of the calculated postage rate. Once confirmation is obtained, the application sends a message to a central postage database. The central database is updated to associate the unique identifier with a postage value equal to the postage rate. Other information may also be included within the database, such as a destination ZIP Code.

When the Postal Service receives an item with activatable postage it validates the activatable postage and then deactivates the activatable postage. The Postal Service validates the activatable postage by extracting the encoded unique identifier from the activatable postage. The unique identifier may be extracted by scanning the activatable postage and providing the information obtained to a decoding utility. The unique identifier is looked up within the centralized database and the postage value associated with the unique identifier is retrieved. The postage value in the database is compared to a postage rate calculated by analyzing the item at the post office. If the postage value is equal to or greater than the postage rate, then the post office updates the central database by deactivating the unique identifier. Once deactivated, the individual instance of the activatable postage will no longer work as postage. If the postage is not adequate, then the post office can take steps to deal with an item having inadequate postage value.

BRIEF DESCRIPTION OF THE DRAWINGS

Aspects of the invention are described in detail below with reference to the attached drawing figures, wherein:

FIG. 2 is a flow chart showing a method for printing, activating, and using activatable postage, in accordance with an aspect of the technology;

DETAILED DESCRIPTION

Figure 1:
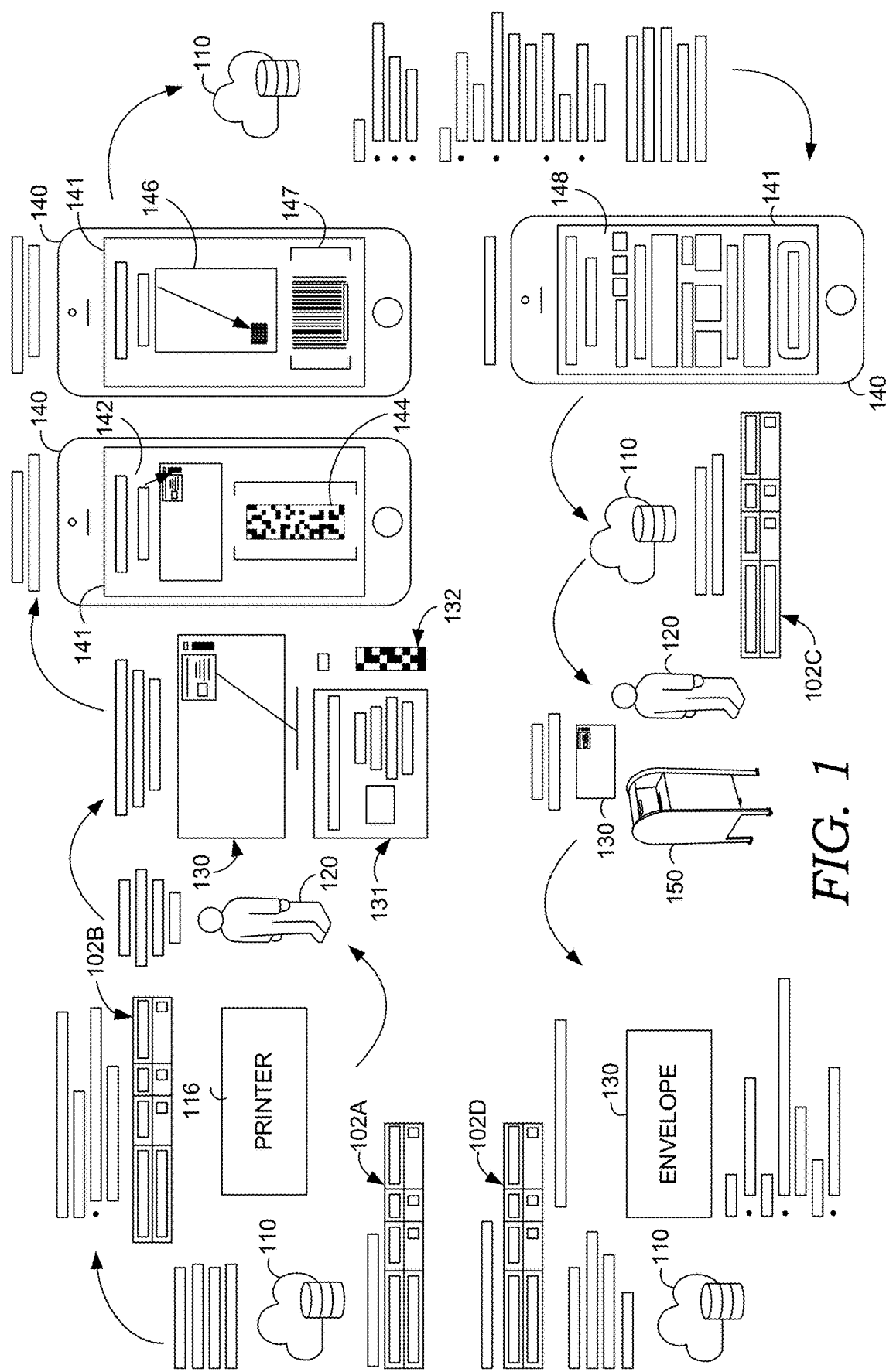
FIG. 1 is a block diagram of an example process flow for printing, in accordance with an aspect of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein provide an activatable postage. The activatable postage has several advantages over the pre-printed postage stamps and on-demand printed postage that is used today, including improved fraud prevention. The activatable postage described herein is less susceptible to fraud, especially forgery, than current postage for at least two reasons. First, each instance of the activatable postage has a unique appearance, in contrast to stamps, which have millions of instances of the exact same stamp. Second, validation of the activatable postage requires a postage value to be associated with an individual instance of activatable postage in a central database. Thus, forging an instance of activatable postage requires a forger to both reproduce the appearance of the activatable postage and hack a database to associate the postage value with an identifier that is machine coded within the activatable postage.

The activatable postage will often be described herein in terms consistent with use with the United States Post Office. The activatable postage certainly can be used with items transported by the post office. However, the activatable postage is not limited to use with the post office. The activatable postage can also provide a payment mechanism for transportation of an item (e.g., letter, package) by any carrier, including FedEx or UPS. As will be seen, coordination between the carrier and the provider of the activatable postage is required for the carrier to accept and validate the activatable postage.

As an initial step, the activatable postage is printed on a media, such as an envelope or sticker. Initially, the activatable postage has no postage value and will not have any value until activated. Each instance of activatable postage comprises a unique identifier encoded in a machine-readable format. The unique identifier may be a string of numbers, letters, a combination of numbers and letters, or some other unique identifier. The unique identifier may be long enough to provide trillions of different unique combinations. The machine-readable format can comprise any method of encoding the unique identifier. Exemplary methods include barcodes, QR codes, a NFC (Near Field Communication) tag, and other RFID (Radio Frequency IDentification) communication technology.

Postage value is added to the activatable postage through an activation process. The activation process utilizes a computer application running on a computing device. In one aspect, the computing device is a user device such as a smart phone, PC, or tablet. In another aspect, the computing device is part of a kiosk provided in a public location, such as a post office or store. In one aspect, an activation kiosk is provided within or nearby a stationary section of a drug store, grocery store, or other store where greeting cards and other stationary may be purchased.

In order to activate an individual instance of activatable postage, the unique identifier encoded in the activatable postage needs to be provided to the activation application. In one aspect, the unique identifier is retrieved by scanning the activatable postage. For example, the camera on a smart phone may capture an image of the activatable postage. The image can be provided by the camera to the activation application which decodes the unique identifier from the machine-readable format in which it is encoded. In another aspect, a decoding utility on the phone is accessed by the activation application to decode the unique identifier.

Once the unique identifier is obtained from the individual instance of activatable postage, the user can provide information about the item to be posted. The information can include a size and weight of the item. Alternatively, the activation application can provide examples for the user to select. For example, a user can be asked to select images of envelopes having different sizes with different amounts of paper in each envelope. Every size combination does not need to be provided, instead representative sizes and amounts of paper can be used to estimate the appropriate postage rate for the item. In one aspect, a UPC label on a greeting card or other item may be scanned to retrieve a size and weight of the item. The activation application may prompt the user to scan the greeting card or other item in order to retrieve a size and weight, postal category, or other information that can be used to calculate the postage rate. The user may also be asked to provide a destination address. In one aspect, the activation application includes the ability to read handwriting. In this instance, the destination address could be obtained by scanning the address listed on the item. In another aspect, the user release provides the ZIP Code of the destination.

Once the item information is provided, the postage rate is calculated. The user may be asked to confirm the amount or authorize payment in the amount of the calculated postage rate. Once confirmation is obtained, the application sends a message to a central postage database. The central database is updated to associate the unique identifier with a postal value equal to the postage rate. Other information may also be included within the database, such as a destination ZIP Code.

The activation process on a public device can differ from the activation process on a private device. On a private device, the user will establish an account when downloading and installing the application. The user account may be linked to a payment method, such as a credit card, PayPal, Apple pay, prepaid postage account, or other electronic payment mechanisms. Once the application is set up, the user may not need provide any additional user/payment information during the postage activation process.

In contrast, on a public device, such as may be found in a kiosk, the user may be asked to login if the user already has an activatable postage account. If the user does not already have an account, the user may need to create an account or at least provide enough information to complete a payment process. Once payment is made, the user may deposit the item with the Postal Service or other carrier.

When the Postal Service receives an item with activatable postage it validates the activatable postage and then deactivates the activatable postage. The Postal Service validates the activatable postage by extracting the encoded unique identifier from the activatable postage. The unique identifier may be extracted by scanning the activatable postage and providing the information obtained to a decoding utility. The unique identifier is looked up within the centralized database and the postage value associated with the unique identifier is retrieved. The postage value in the database is compared to a postage rate calculated by analyzing the item at the post office. If the postage value is equal to or greater than the postage rate, then the post office updates the central database by deactivating the unique identifier. Once deactivated, the individual instance of the activatable postage will no longer work as postage. If the postage is not adequate, then the post office can take steps to deal with a having inadequate postage.

Various implementations are described with reference to FIGS. 1-3. In an aspect, a traditional stamp is replaced with a unique object or code (e.g., a QR code, a UPC code, a digital tag like an NFC (Near Field Communication) device or other RFID (Radio Frequency IDentification) communication technology, or the like) that is read by a user's phone. The phone includes a mobile postage application ("app") that scans the code, allows the user to calculate and pay the desired/required postage, activate the code as postage detectable by a mail courier that will take the item from the sender/gift giver to the recipient/gift receiver, and follow the progress of the item along its path to the recipient/gift receiver.

In one embodiment, illustrated at right as FIG. A, the technology described herein may take the form of a unique QR code 10 (or other UPC code or digital tag like NFC) place or printed in the upper right-hand corner of every envelope 12. The manufacturer of the envelope does not have to pay the postage at the time of manufacture and the purchaser of the envelope does not have pay the cost of the postage (which could be unknown at the time of the purchasing of the envelope) at the time of purchase of the envelope. The code is not active, but is activatable by the user of the envelope. The code need only be unique, such that it may be tied to that particular envelope.

When the purchaser or possessor of the envelope desires to use it to send the envelope via mail (e.g., First Class mail via the U.S. Postal Service) or other courier service (e.g., an overnight delivery service, such as UPS, FedEx, or some other service that transports items, such as messenger service, Uber drivers, airlines, trucking companies, individuals, etc.), that person scans the QR code 10 with their phone and a mobile postage app is activated that allows them to add postage to this unique envelope. The mobile postage app integrates the scanning feature (whether QR, UPC, NFC, etc.) with a prompt to the user to enter or scan the destination zip code or address printed or written on the front of the envelope. This can be done manually or by taking a photo of the front of the envelope and character recognition software used to enter the destination address into the app.

The user could also be prompted to enter in information about the item being placed in the envelope. In this example embodiment, the contents of the envelope is a greeting card. Accordingly, the user could scan, with the camera of their phone in the app, the UPC of the greeting card. This information could then be sent through the app to a database which contains information on the specifics of the card, including size and weight. The card specifics can be sent back to the app to allow the app to calculate the desired postage needed at the then current rates of the mail or courier service being used to transport the envelope from its current location (which, if relevant, can be determined by the GPS location of the phone or entered manually by the user) to the destination.

The app would then present the user with the calculated amount and prompt the user to confirm they want to use the calculated amount or add additional postage if they have modified the package in some way. For example, if the user placed photographs or gift cards in the greeting card, the user would select the option to add additional postage to cover the increased weight. Similarly, the user could add increased postage, in some instances, to increase the speed at which the envelope is moved along its route (e.g., overnight vs. standard ground transportation). The app could prompt the user with these choices and options and help them determine the additional amount needed.

Once the postage is determined, the user is prompted to pay the postage calculated via their mobile device. This could be done, for example, via a credit card payment. The user may have a credit card stored in the mobile postage app or they may scan their credit card via the camera of their phone through the app which captures the information via character recognition technology. Other means for payment in a mobile environment are possible and contemplated and within the scope of the technology described herein.

Once the payment has been made, the QR code is "live" or activated. The QR code identification details, along with the purchase details, including postage, are transmitted to the responsible courier. In the present example, the fact that the QR code has been activated and the postage associated with the QR code would be communicated to the USPS (or other delivery provider). The USPS would then enter this information into their database of active codes so that when the envelope is scanned and sorted through existing postal systems, once the user puts in in the postal stream, the QR code would be recognized as active and valid postage and the envelope would be delivered to its destination. The money collected through the alternative postage purchase process, or a portion thereof, would then be transferred to the appropriate mail or courier service, so they are paid for transporting the envelope.

Figure 1A:
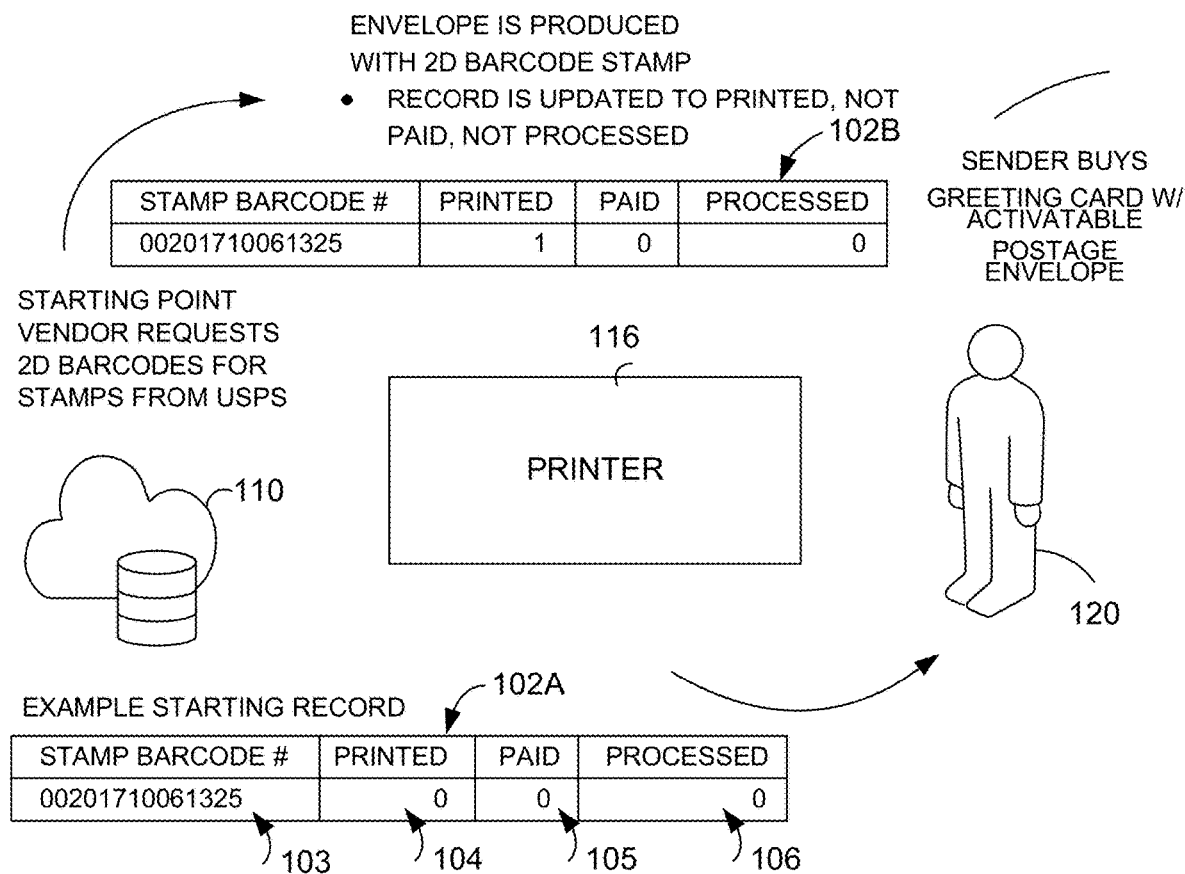
FIGS. 1A-1F are a block diagrams of an example process flow for printing, activating, and using activatable postage, in accordance with an aspect of the technology.

Turning now to FIG. 1, a graphical overview of an exemplary version of the technology described herein, is disclosed. FIG. 1 is broken into smaller portions that are enlarged and provided as FIGS. 1A-1F. FIG. 1A discloses a "starting point" of the illustrated embodiment. Here an envelope manufacturer, such as Hallmark Cards, Incorporated ("Hallmark"), requests unique 2D barcodes from an entity that will eventually be carrying the envelope, such as the USPS. The unique 2D barcodes are stored in a database. In one embodiment they contain additional information associated therewith relating to the status of the barcode. In the illustrated embodiment, this is shown as a table or a "starting record" with various fields. The fields may include information on the barcode such as an "active" status indicator, a "paid" status indicator, and a "processed" status indicator. At the onset, all of the fields indicate a "0", as the barcode is neither active, paid, nor processed at this point. The information associated with the barcode can also include information on the size of the envelope upon which the barcode was placed. This can be used later for calculating the postage required.

It is worth noting that, in another embodiment, the envelope manufacturer may generate their own unique codes that they later provide to the various carrying/delivery services. This, however, would take some coordination if the system were to have more than one envelope manufacturer.

Turning back to FIG. 1A, once the envelope is made with a barcode printed thereon, the database is updated to indicate the barcode has been used (i.e., it is on an envelope). It, however, is not yet paid for, nor has the barcode been used as a stamp. The envelope with the barcode is then put in the stream of commerce where a "SENDER" purchases the envelope, perhaps along with a greeting card. It should be noted that the envelopes could be sold without accompanying items such as greeting cards. Users could buy them for sending their regular mail. In this manner they would never need to go purchase stamps, as they could simply activate them when needed and the then current postage rate could be applied.

Figure 1B:
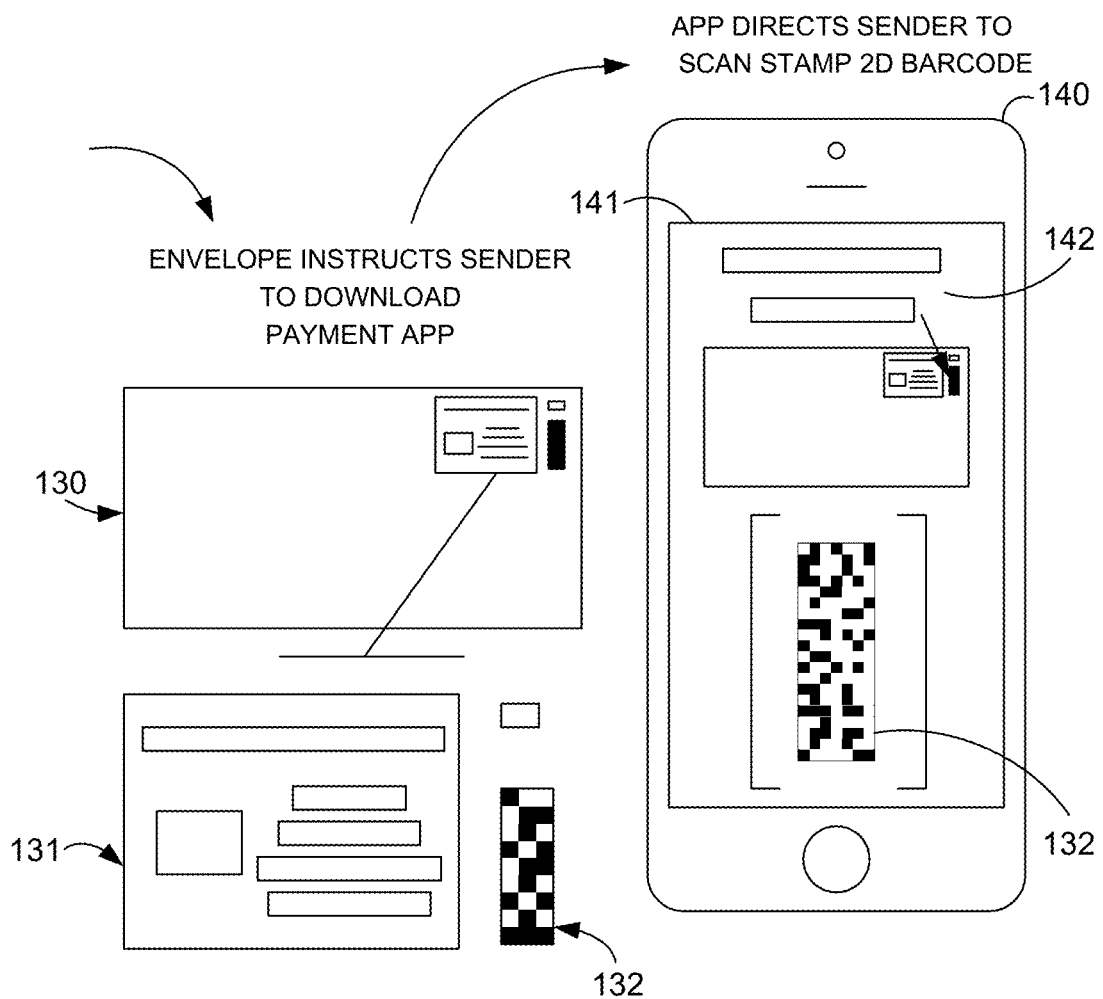

In FIG. 1B, we see that where one would normally place a stamp (i.e., in the upper right-hand corner) a visual marker is placed to convey to the user of the envelope that the envelope doesn't need a stamp but that the user may activate the visual marker as a stamp. The visual marker may include stamp-like graphics, logos, and other items. It will also include the barcode. Again, as discussed above, the barcode could be any number of items, instead of the QR code illustrated. It should be noted that a less identifiable code could be used. For example, the crown in the illustrated visual marker could be embedded with coding detectible to the app's scanner, but not readily perceptible to a human user (i.e., it is a machine readable code that is not perceptible as such by the human eye). The appearance of the clear machine code, however, may be useful in conveying to users that it is to be scanned and where to scan.

The user downloads the mobile postage app (in this case identified as the HALLMARK PROJECT EAGLE app) and installs the same. When the app is opened the user has the option to proceed with the process to activate a "stamp" or envelope. One step in that process is to scan the barcode of the envelope. The GUI may graphically direct or illustrate to the user the portion of the visual marker they are to scan. Once the barcode is scanned, that information may be transmitted to the database.

While not illustrated (as it is not necessary in this embodiment), the user may also be prompted to enter information about the destination of the envelope, as this may affect the postage due. The user could key in the information manually though a keyboard displayed on their phone, use speech-to-text voice recognition, or may use the same camera and scanning process used to capture the barcode to capture the address written on the front of the envelope. The app can include character recognition software to identify the letter and numbers in the image to enter destination information, such as city and zip code. This can be used in the relationship app later, in addition to being used in fee calculation. A further step could be provided to give the user the ability to speed up the delivery process by paying an increased fee (e.g., for overnight delivery when used with such couriers). Since the illustrated embodiment is for domestic use of first class mail, the destination information is not necessary to obtain, as it doesn't affect the postage needed.

Figure 1C:
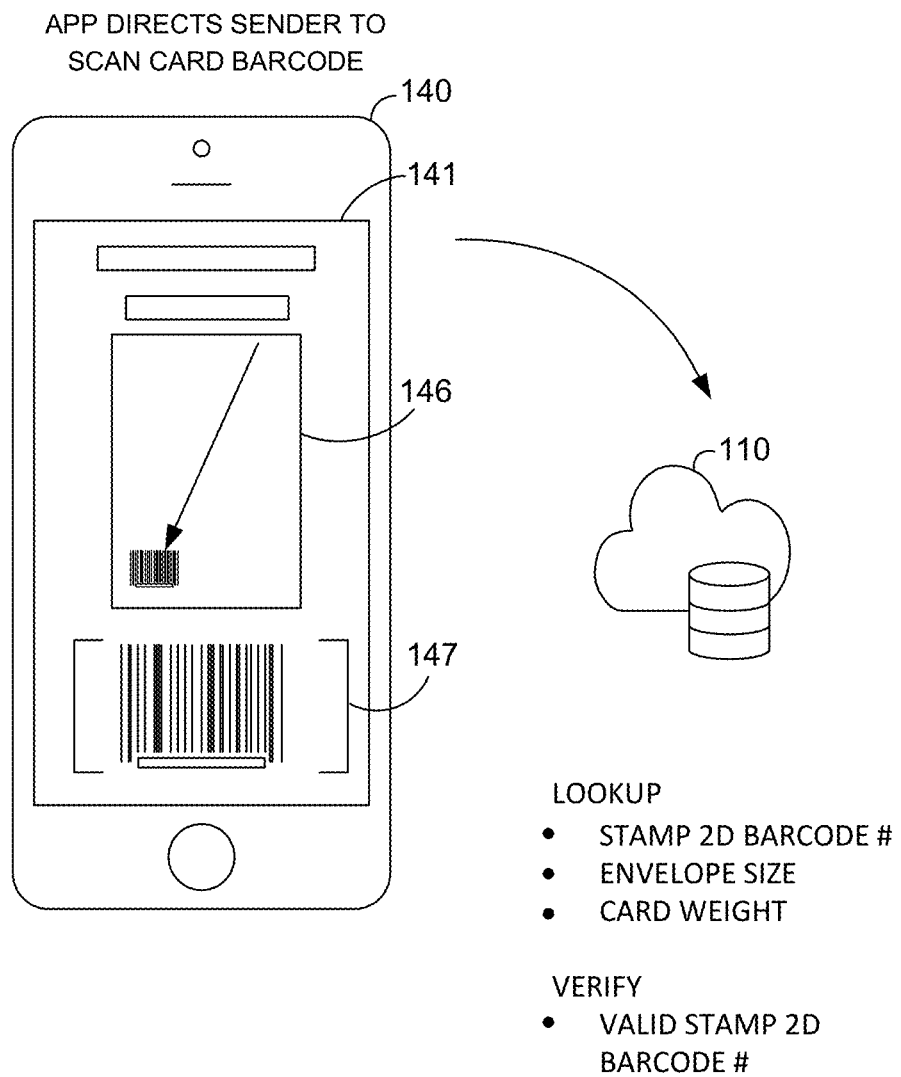

In FIG. 1C, the user is instructed to provide information about what is being sent inside the envelope. Where, as here, the user is sending a greeting card in the envelope, the user may provide information about the contents simply by scanning the UPC of the greeting card. That information is sent to a database which collects details on the card being sent, including the size and weight of the card. The contents information is then sent to the database as well. This is the "Lookup" step. The verification process begins, including checking with the database to confirm the barcode is valid.

Figure 1D:
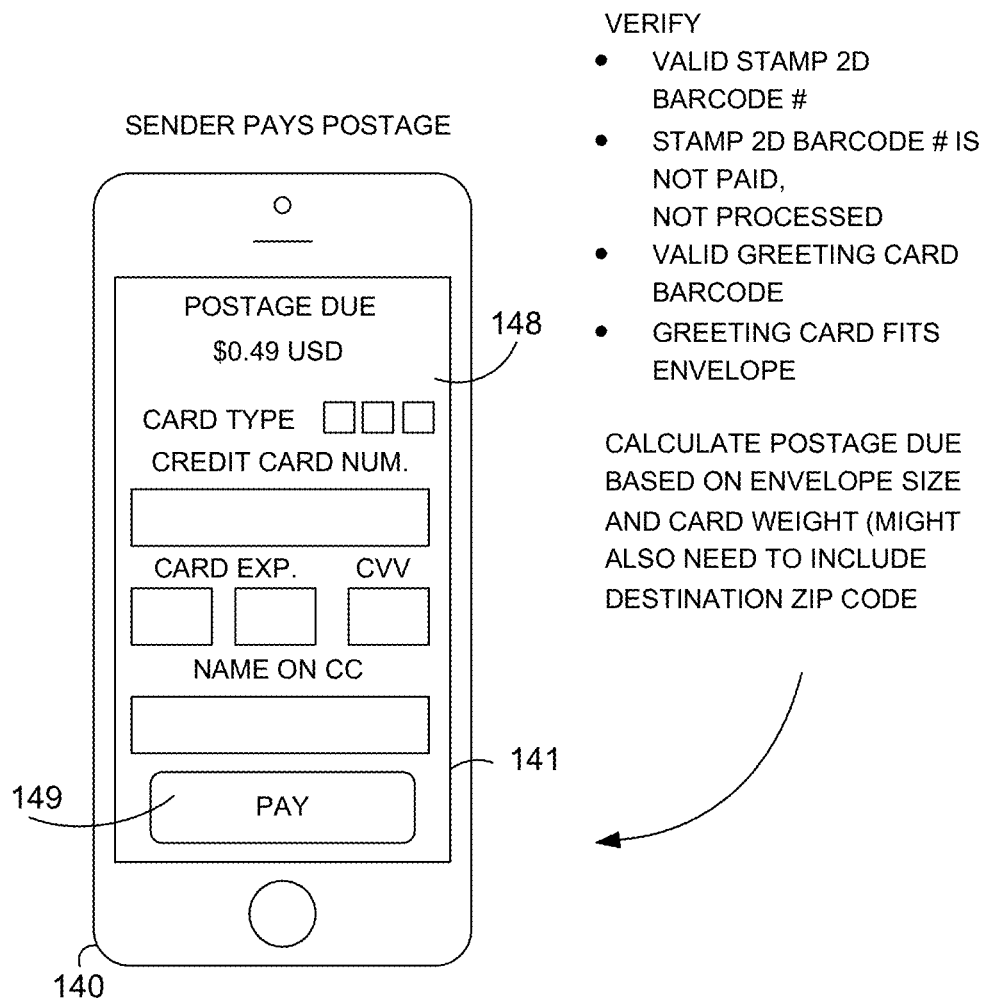

The remaining "verify" steps are shown in FIG. 1D. Verification/confirmation that the barcode is valid includes the fields showing the barcode is active, not already paid for, and not already used in a mailing. This step can also determine other information, such as whether the scanned greeting card will fit in the envelope being activated.

Once the verification process has occurred, the app uses the gathered information, along with the known information on costs provide by the courier of the envelope, to determine the postage due. The calculated postage due is displayed to the user and they are prompted to pay the amount through the app. In the illustrated embodiment, a user is prompted to enter their credit card information. This information can be stored in the app for later purchases. Alternatively, the same camera and scanning process used above can be used to scan (i.e., capture an image of) the user's credit card and the character recognition software can determine the numbers/characters and enter them for the user. Any other online payment options and payment verification methods may be used at this step. Once the information is entered, the user indicates they want the postage activated, in this case by pressing the "ACTIVATE" icon.

Figure 1E:
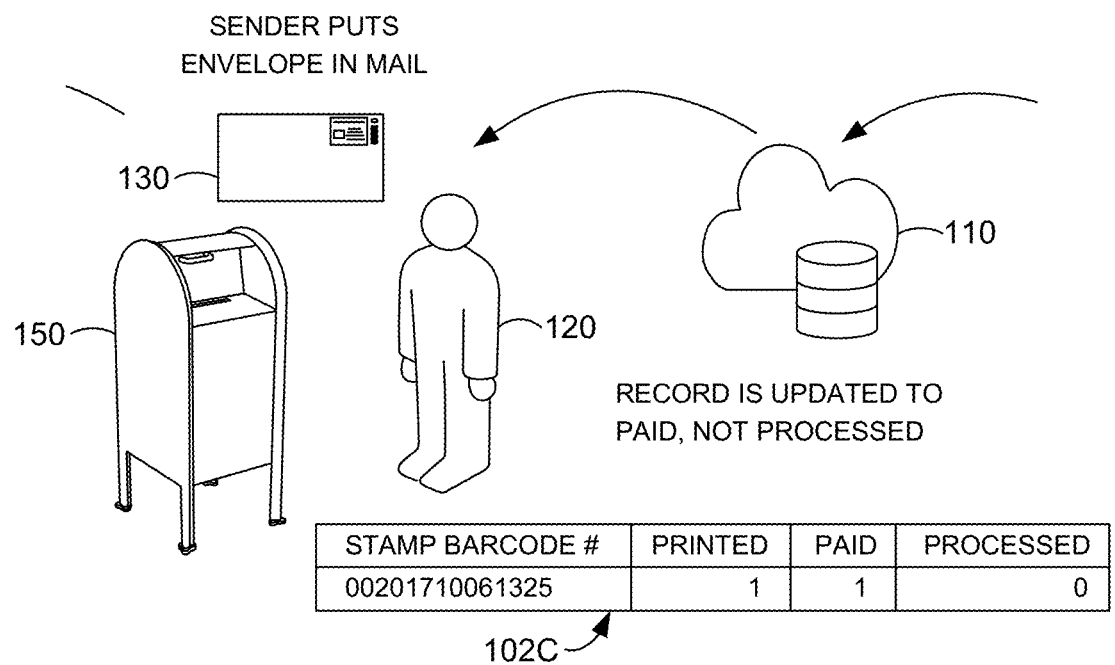

Once activated, the user, in FIG. 1E, hands the envelope over to the courier, which, in this case, is putting the envelope in a USPS mailbox. Also, upon activation and payment, the record associated with the barcode in the database is updated to indicated the barcode is not only active, but also paid (i.e., valid postage ready to be used).

Figure 1F:
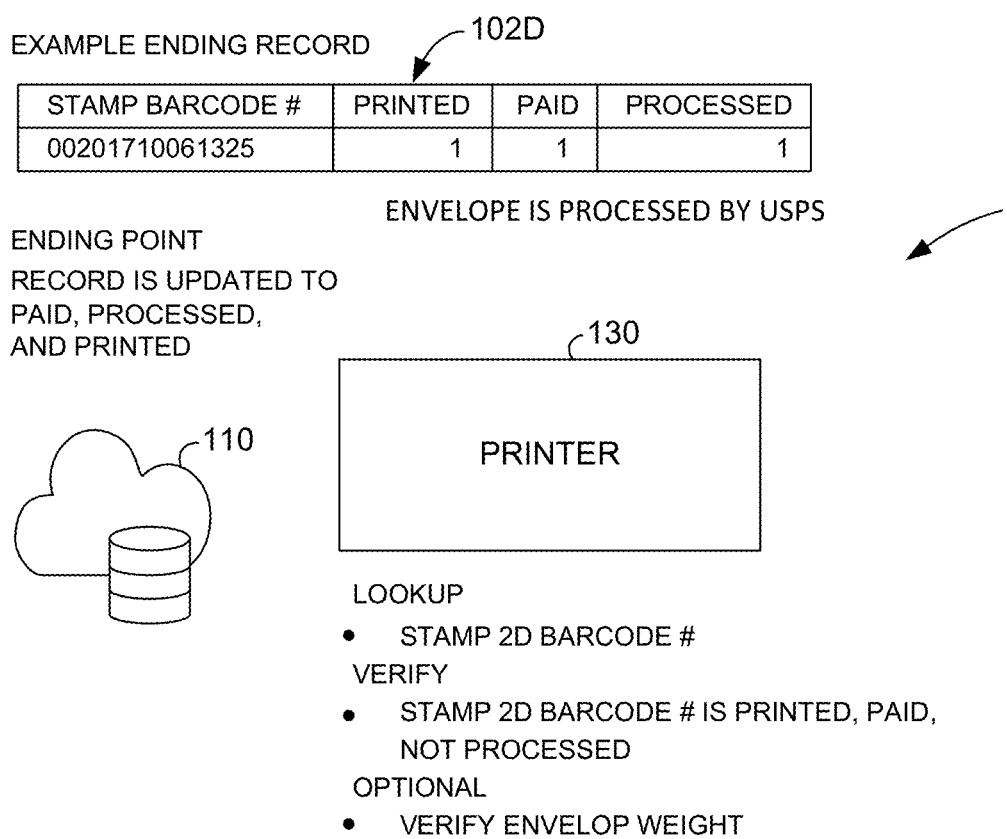

FIG. 1F illustrates the envelope passing through the USPS system. Here, the barcode is scanned by a postal machine and compared with the database. If the barcode is active and paid, but not yet processed, the envelope is allowed to pass through and go out for delivery. If it was not activated or paid for, or if it was already used, the envelope can be treated like any other envelope received by the USPS that doesn't include postage. The postal system can also verify that the weight of the envelope is the proper amount for the postage that was paid. If the envelope is heavier than the amount calculated, the envelope may again be treated like any other piece of mail with insufficient postage. When everything is correct and verified, the envelope is sent on for delivery and the database is updated to show the barcode as now inactive and processed (i.e., already used—the equivalent of a cancelled stamp).

Figure 2:
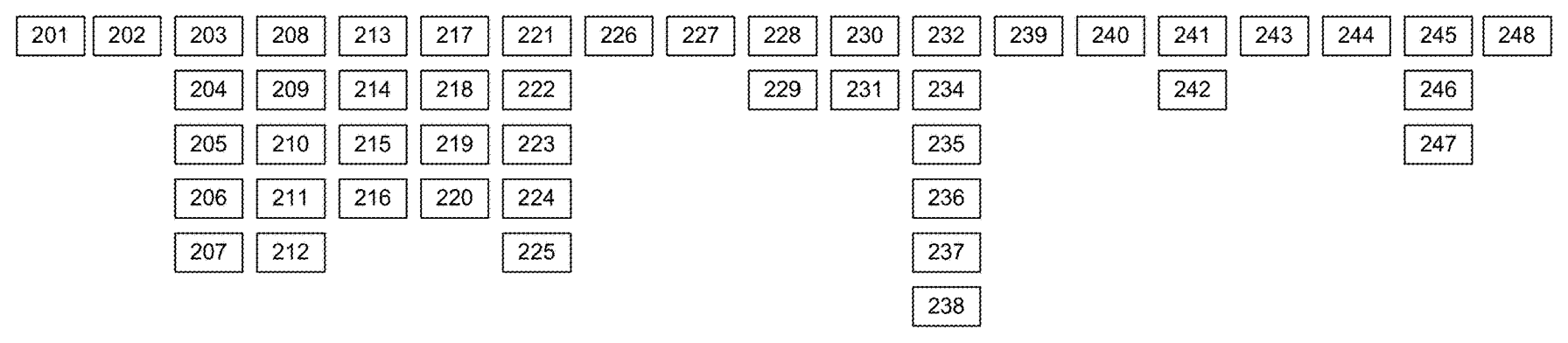

FIG. 2 is a flow diagram showing a method 200 for activating postage, according to an aspect of the technology described herein. FIG. 2 is broken into smaller portions that are enlarged and provided as FIGS. 2A-2F. Turning now to FIG. 2A, at step 201 the user decides whether to send the envelope via mail (i.e., he needs postage activated) or hand deliver the card to someone. The technology described herein allows for such an option, whereas pre-paid postage requires the user to pay for the postage at the time of purchase, whether they will use it or not, and without knowing if they will need additional postage. Here, there are no upfront costs and costs are only incurred if the user decides to activate the postage.

At step 202, consumer awareness marketing of the app and the alternative postage option is performed.

At step 203, the user may then download the app. This can be done manually by navigating to a webpage or searching for the app in an app store. At step 204, the postage activation app can be accessed by scanning the pre-printed postage with a camera on a smart phone, table, or other device on which the application is to be installed. In this way, the barcode can serve as both activatable postage and a guide to find and download the application needed to activate the postage. In one aspect, the barcode comprises two different barcodes encoding different information. One barcode can encode the activatable postage identifier and the other the app identifier. While installing the app, standard app setting up questions may be asked to access a camera, GPS, contacts, or other device functions. At step 205, a request to access contacts is made. At step 206, a request to access a camera is made. At step 207, a request to access GPS (or location services) is made.

Figure 2A:
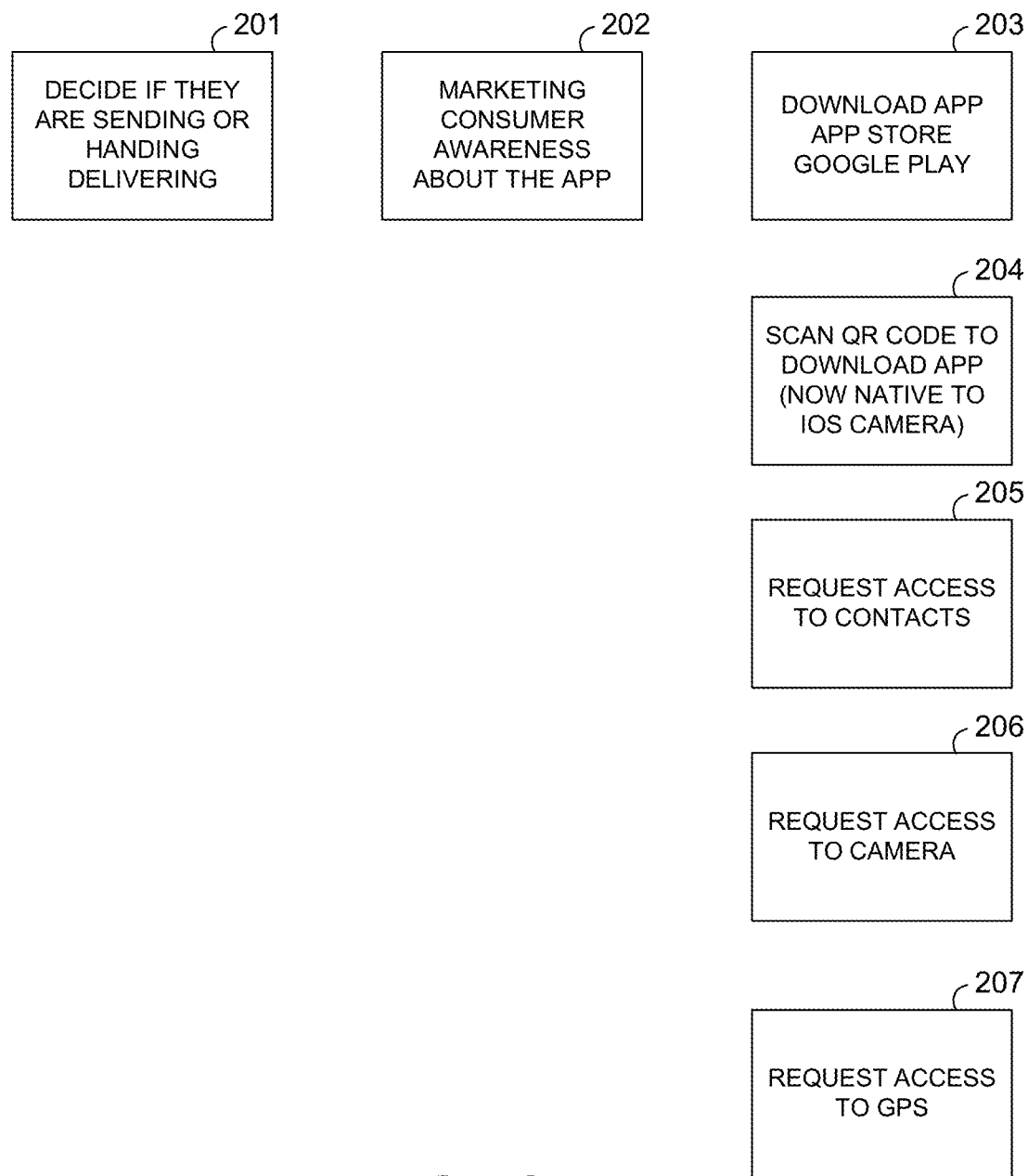
FIGS. 2A-F are a flow charts showing a detailed view of a method for printing, activating, and using activatable postage, in accordance with an aspect of the technology.
Figure 2B:
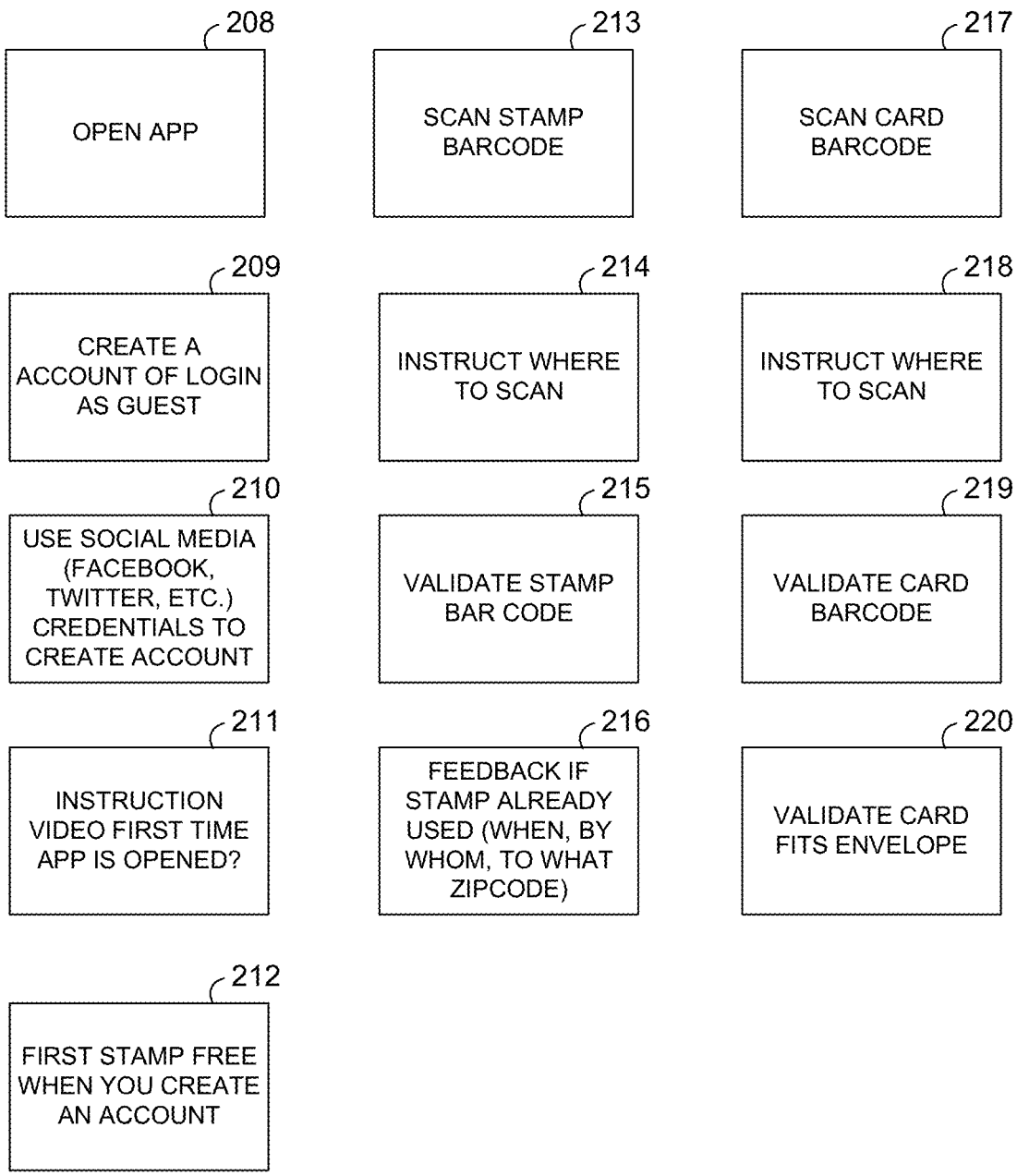

Turning now to FIG. 2B, at step 208 the user opens the app and at step 209 creates an account (or proceeds as a guest.) At step 210, the user supplies social media credentials to create an account. At step 211, and instruction video may be shown, if desired. At step 212, a free stamp or credit may be given. The user may be asked to supply a payment method, such as a credit card to the application. Postage purchases may be made on an as-needed basis or postage could be purchased in a block, such as $50.00. If purchases in a block, individual postage transactions can be deducted from the available balance.

At step 214, the app can output for display instructions showing a user where to scan the barcode. At step 213, a user may scan a barcode of the activatable postage. At step 215, the app validates the scanned barcode. In order to validate the scanned barcode, the application may request information about the unique identifier decoded from the barcode from a central server that tracks the status of activatable postage. At step 216, the application can provide feedback if the stamp has already been used or is otherwise unavailable for use.

The app then requests information on the contents of a package on which the postage is printed or affixed. Where the contents are a greeting card, the user is prompted to scan the barcode (i.e., UPC) of the greeting card at step 217. At step 218, the app can show the user where to scan the UPC. At step 219, the card's barcode can be checked and information about the card can be compared to the envelope to confirm the card fits in the envelope being used, thereby validating the envelope at step 220.

Figure 2C:
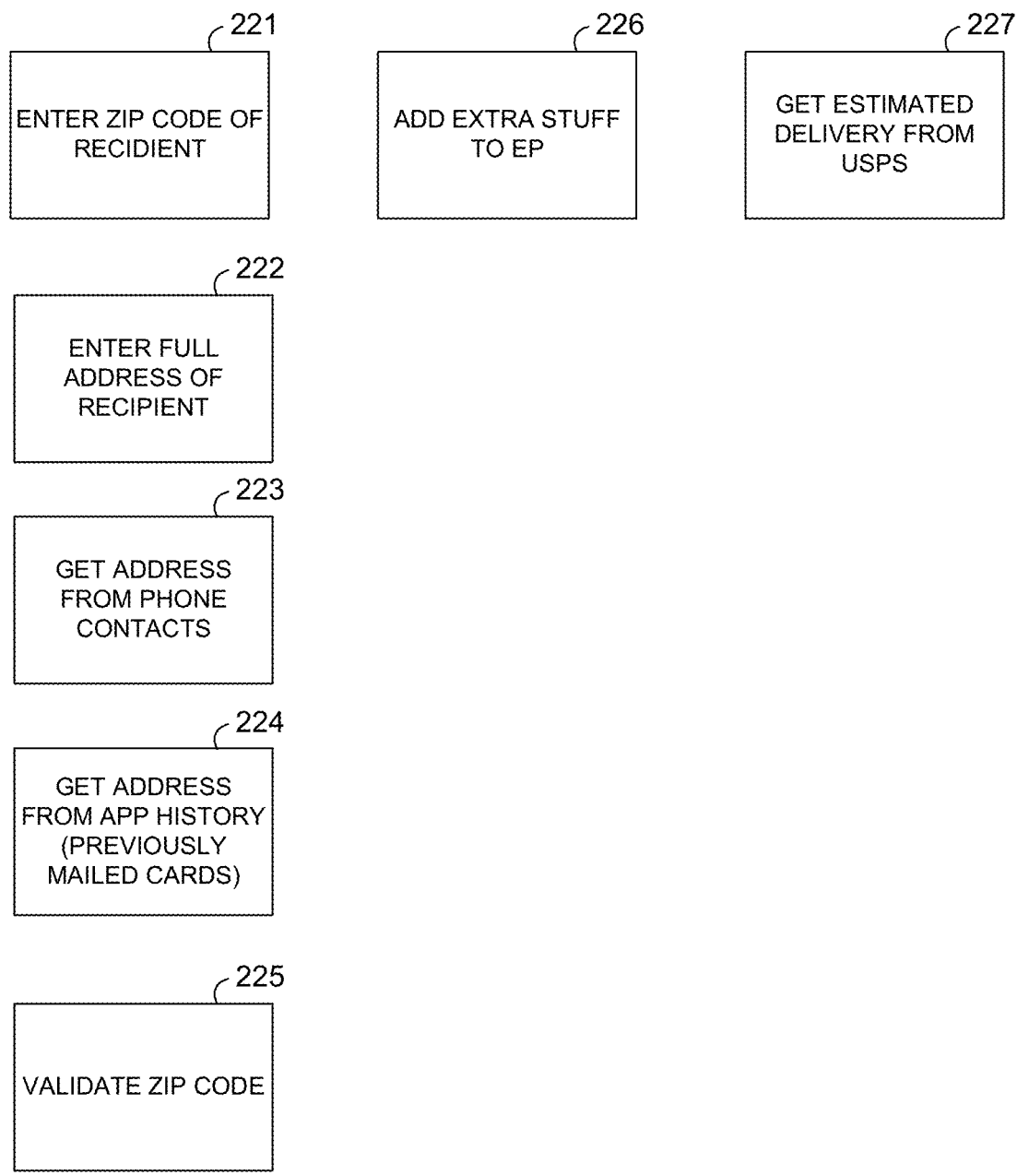

Turning now to FIG. 2C, at step 221, the user is prompted provide information about the destination of the envelope, such as the zip code. This information can be the full address (step 222). At step 223, the information can be pulled from the user's contacts. At step 224, the app can also store previous addresses used in a history file and that information can be provided to the user in order for the user to supply the destination address. At step 225, the entered zip code can be validated for accuracy. At step 226 and 227, the app can also obtain information from the courier at as to the estimated delivery of the envelope to the entered destination.

Figure 2D:
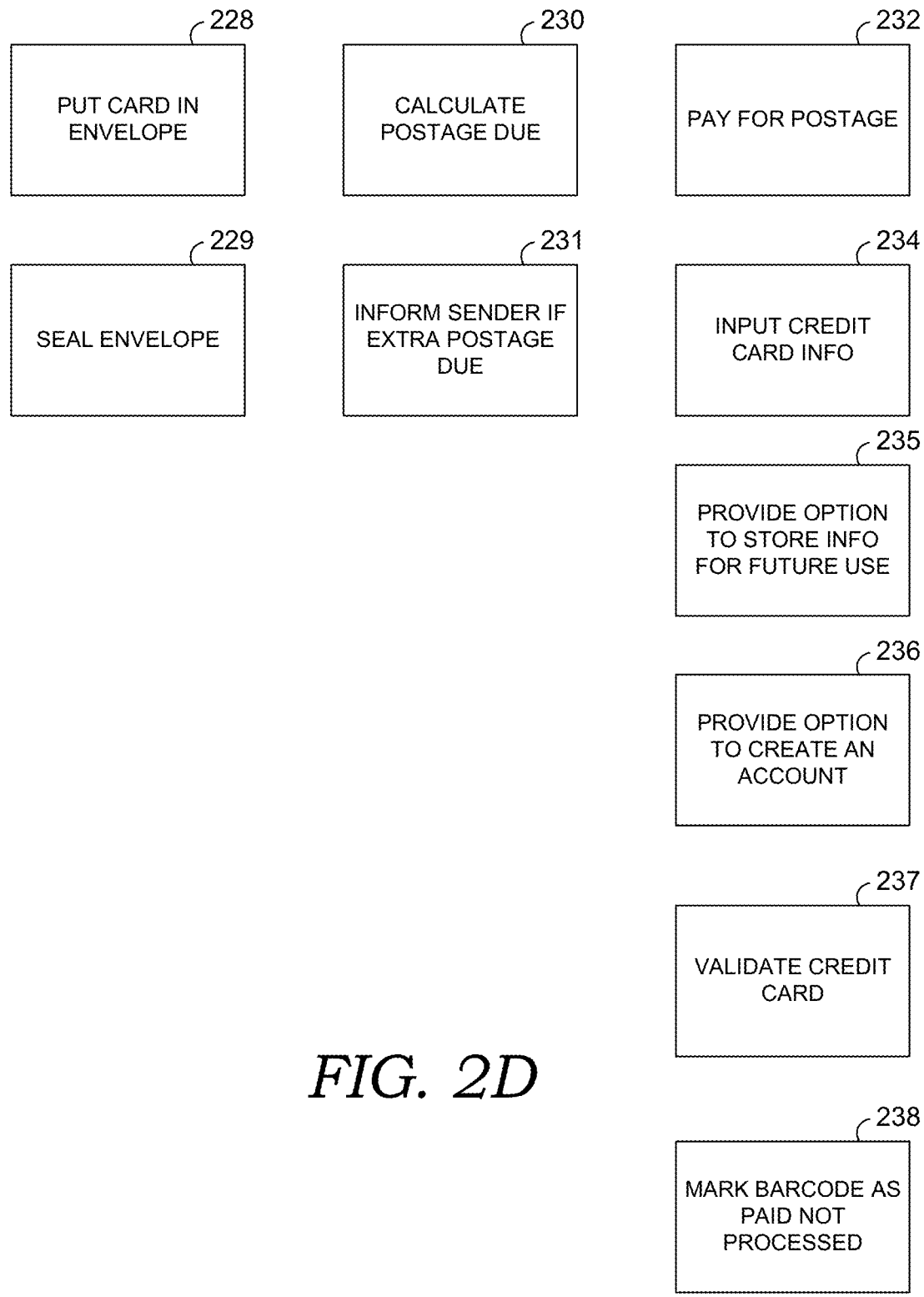

Turning now to FIG. 2D, at step 228, the user is prompted to put the card in the envelope and seal the envelope (step 229). At step 230, the app uses the gathered information to calculate the postage due. At step 231, the user can be prompted to see if they need to add extra postage because they have added additional items to the package. The app can also inform the sender if extra postage is due from the obtained size date.

Once those items are handled, the user is instructed to pay for postage at step 232. At step 234, the user pays for the postage by inputting credit card information. At step 235, the user can be prompted to store the information for future use or create. At step 236, the user can be asked to create an account, if the user does not already have an account. At step 237, the credit card information is validated. At step 238, the central postage database is updated to indicate that the barcode is paid and active, but not processed (i.e., previously used).

Figure 2E:
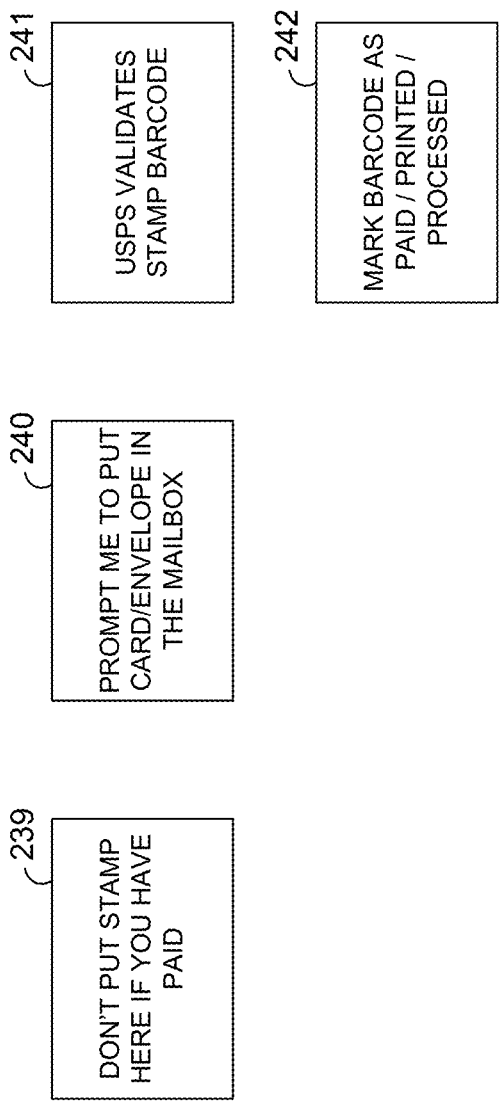

Turning now to FIG. 2E, at step 239, the app informs the user to not place a stamp on the activated code. At step 240, the user is prompted to place the envelope in a mailbox for collection. Once in the mail system, the courier (the USPS in this example) validates the barcode at step 241. At step 242, the postage carrier can the update the central postage database to show the barcode as paid, not active, and processed.

Figure 2F:
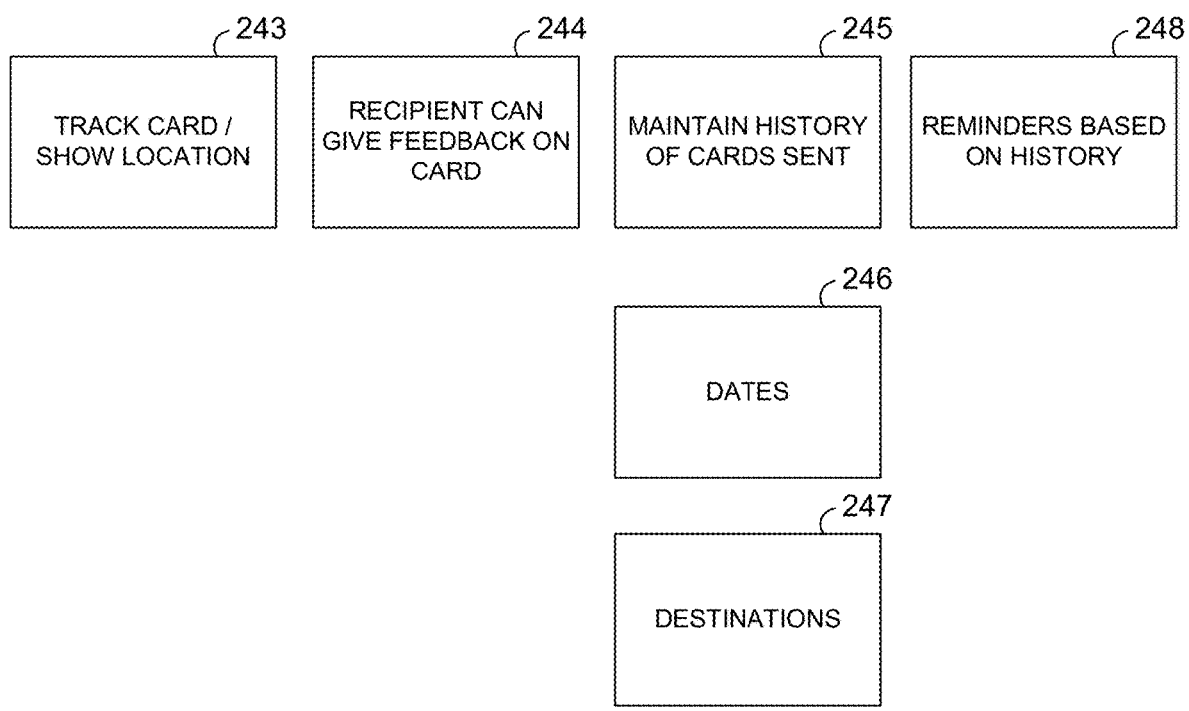

FIG. 2F illustrates some further steps that can be provided by the app and which are discussed in more detail below. For example, at step 243, the app can track and display the location of the envelope as it moves through the delivery process. This can include alerts to the user as the envelope nears the known destination. At step 244, the recipient, if also an app user, can give feedback to the sender on the card. At step 245, the app can keep a history of the cards sent to each recipient and the timing of the sending. At step 246, the date of the deliver is stored. At step 247, the destination of the delivery is stored. At step 248, this information can be used to help the app user in the future. For example, if the app determines from a previous use and scan that the user sent a birthday card to someone on May 5th, the following year the app may send a notification to the user on April 25th asking if they want to get a birthday card for that person's upcoming birthday. Additions to the app may allow for shopping for that card through the app or directions to a nearby location where cards can be purchased. The app may even suggest cards based off of the previous genres sent to that particular recipient.

Figure 3:
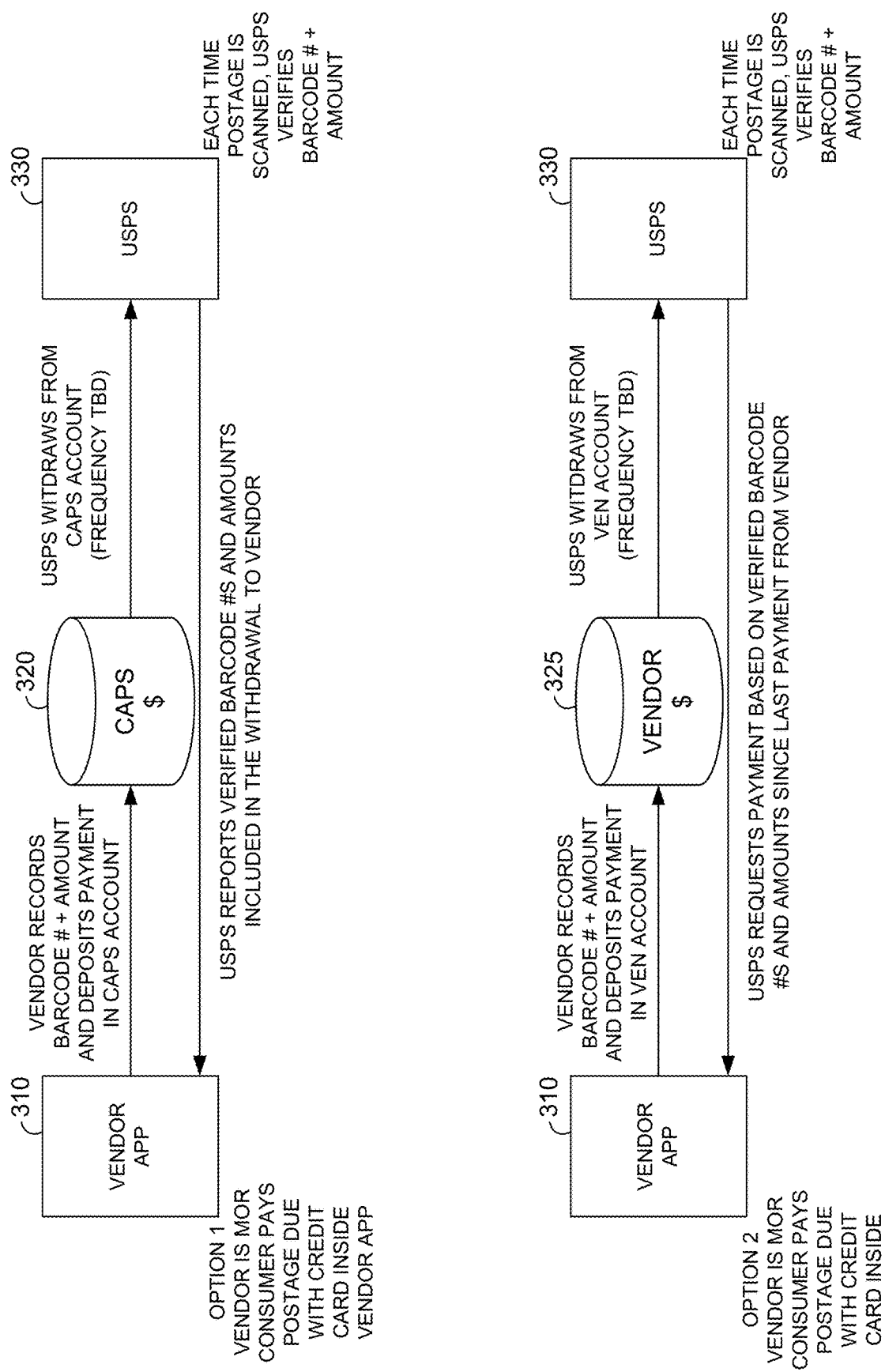
FIG. 3 is a sequence diagram showing a method of paying for activatable postage, in accordance with an aspect of the technology.

FIG. 3 illustrates various methods for collecting and distributing payment depending on the systems preferred by the app operator or delivery partner. For example, in Option 1, Hallmark is the Merchant or Record ("MOR"). Hallmark, as manufacturer of the envelopes, provides the app 310 and consumers pay postage due in the Hallmark app. Hallmark establishes a Centralized Account Processing System ("CAPS") 320 account with the USPS (or other carrier). A CAPS account is the USPS's electronic postage payment system. Hallmark enters the barcode numbers and postage paid amounts in the CAPS account. The USPS 330 withdraws money for the verified and processed barcodes from the CAPS account. USPS performs the scanning and verification in the mail process. USPS then reports to Hallmark the barcodes used/cancelled/activated/processed and the amounts withdrawn from the CAPS account.

In Option 2, Hallmark creates an account separate from the USPS's CAPS system. USPS still verifies the barcodes and amounts, but then requests payments off of those activations from the Hallmark account. In Option 3, USPS is the MORand, as such, the consumer pays USPS directly for the postage, either through the Hallmark app or through an Application Programming Interface ("API") 312.

In addition to the mobile postage application providing for activation of alternative postage, the app can be used to get the sender more involved in the sending process. In that regard, the app can provide a relationship component as well. For example, the app can digitally depict all of the user's activated envelopes as the journey through the mail/delivery process and thereby create for the sender an interactive storytelling experience that strengthens relationships. The interactive storytelling experience includes basic tracking functions, alerts, notifications, reminders, product and content recommendations, as wells as collecting/providing addresses. Over time, the interactive storytelling experience creates cumulative data visualizations of a sender and recipients' connecting loop and relationship growth.

One method of facilitating this connection can occur during the envelope and greeting card scanning process. Here the sender is requested to photograph the greeting card cover or scan the UPC barcode on the back of the card. They are also prompted if a recipient's address should be looked up and/or saved. This process will connect them to a digital address book and/or their universal address book from other platforms if needed. When the address is saved, senders are prompted that other key information could be added such as birthdays. Senders are not required to enter information immediately. The recipient name and relationship may be required, as it is used throughout the storytelling process.

The image of the greeting card or other likeness is then taken through an animated interactive journey that tracks the envelope's progress through the mail to the recipient. Along the way prompts and notifications alert the sender of the delivery path and possibly collects other sender or recipient information in a gamified manner. When the envelope arrives at the physical address, the sender receives a notification and prompt on their phone to return eventually to the app. The app will also receive an on-screen app icon standard notification (e.g., a red badge). When the app is opened, the sender will receive an affirmation animation of their card's impact on the recipient. An example could be an animated greeting card opening and releasing hearts, graduation caps, birthday balloons, and other seasonal/occasion based icons. Other examples could be avatar based with sender and recipients receiving animated badges, totems, tokens, or symbols that transform themselves, objects, or grant them access to various kinds of rewards.

The recipient could also participate by logging on to the app through the envelope or greeting card or through an invitation from the sender. The invitation could be physically noted in the greeting card or sent through a digital interface like a text message or email. The recipient can send digital feedback to the sender in the storytelling experience with similar or same actions/reward as described above.

Over time the interactive storytelling experience creates cumulative data visualizations of sender and recipients connecting loop and relationship growth. For example this could be represented through maps and the building of bridges, or a tree that grows heart shape leaves with each card and changes seasonally, or simple, but fun graphs that tie into the themes of the overall app. The data fueling the visualization will come from the addresses collected and sender/recipient entered information, as well as potential feedback from the delivery provider (e.g., USPS). The sender will receive reminders, notifications, and product/content recommendations based on metadata, key words, and profiling strategies. As senders interact with the app, their collected data and interactions will tailor recommendations and digital storytelling to fit the consumer's personal connecting style.

Figure 4:
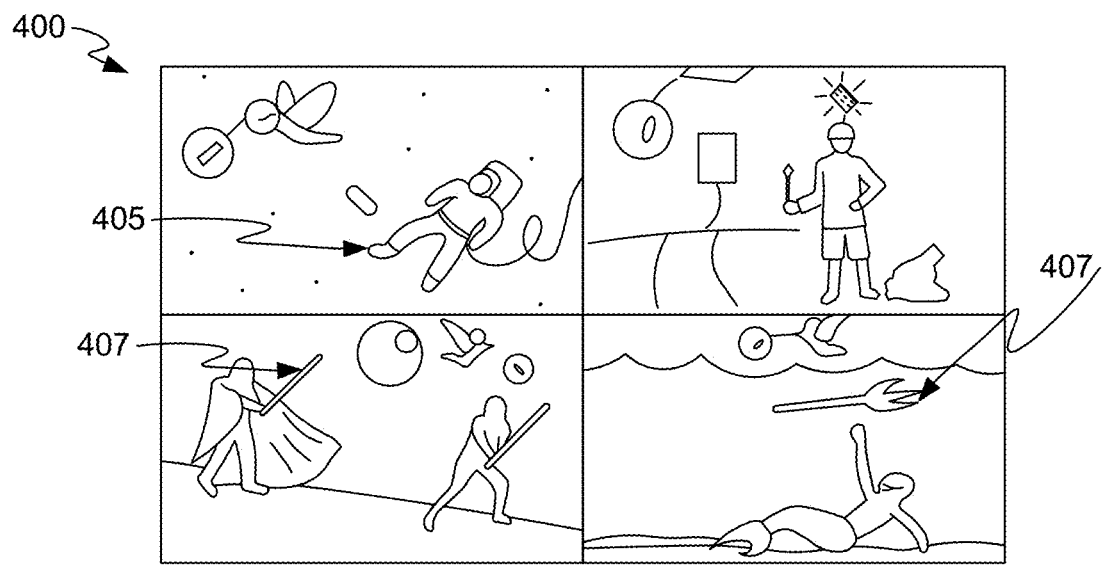
FIG. 4 is a diagram showing exemplary incentives for using activatable postage, in accordance with an aspect of the technology.

For example, connections could be represented as gifts of digital tools, items, and artifacts providing fantastical or more representative individual enablement based on the personality type of the recipient, as depicted in FIG. 4.

Figure 5:
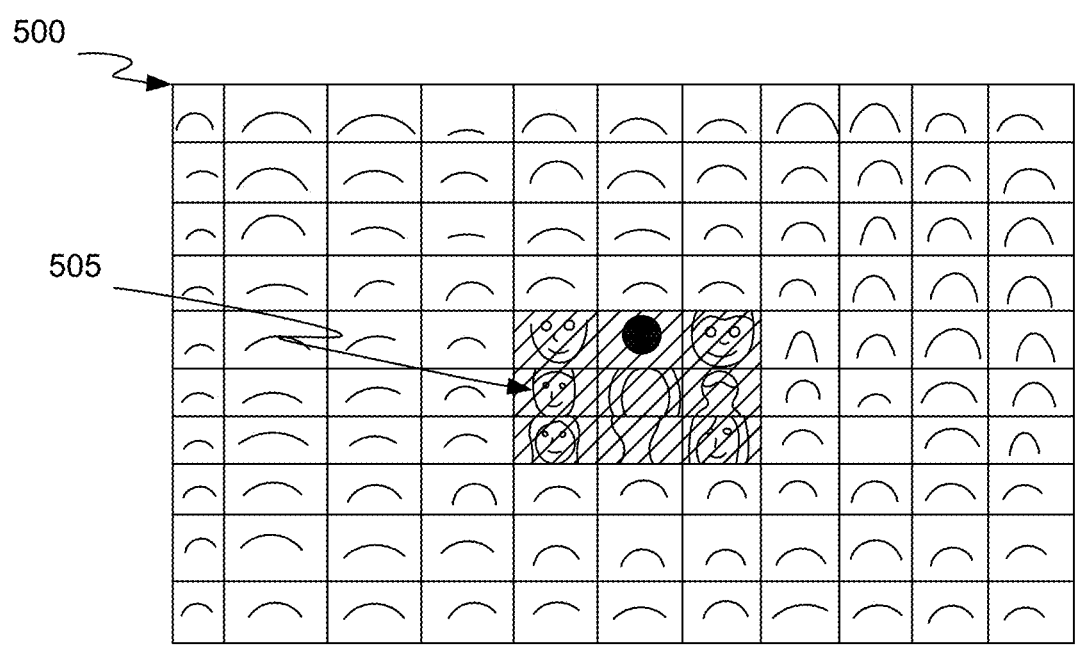
FIG. 5 is a diagram illustrating contacts who have received letters mailed with activatable postage, in accordance with an aspect of the technology.

Likewise, a tracking of the relationship could be depicted in a manner that visually conveys information to the user. For example, over time, the relationships affected could be represented as visual avatars of heroes or other characters in an expansive grid with the characters that have strengthened the most near the center, as depicted in FIG. 5.

Figure 6:
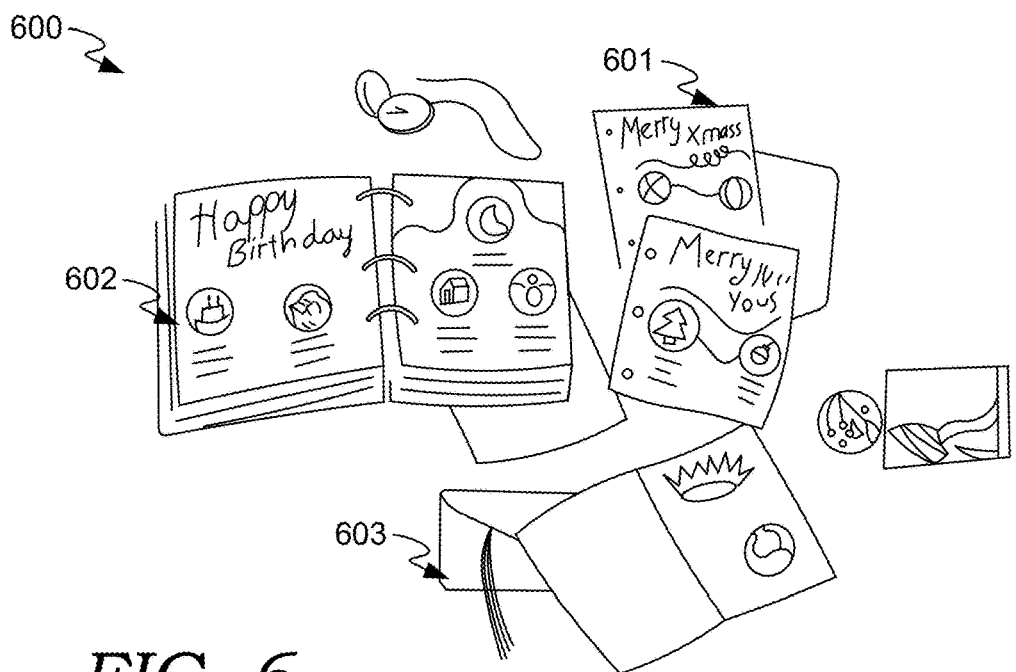
FIG. 6 is a diagram illustrating a graphical encouragement for using activatable postage, in accordance with an aspect of the technology.
Figure 7:
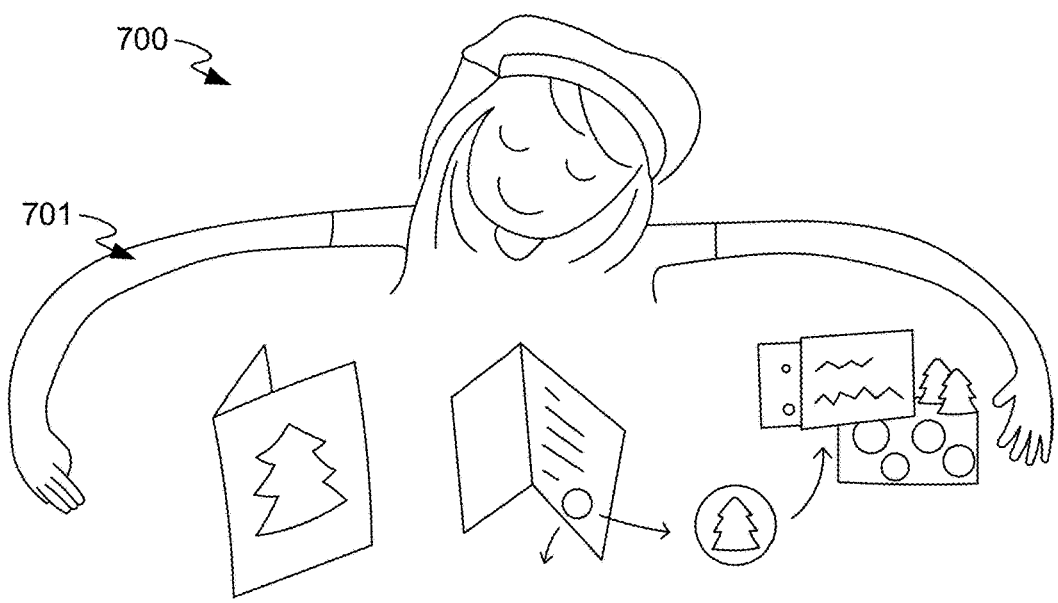
FIG. 7 is a diagram illustrating a graphical encouragement for using activatable postage, in accordance with an aspect of the technology.
Figure 8:
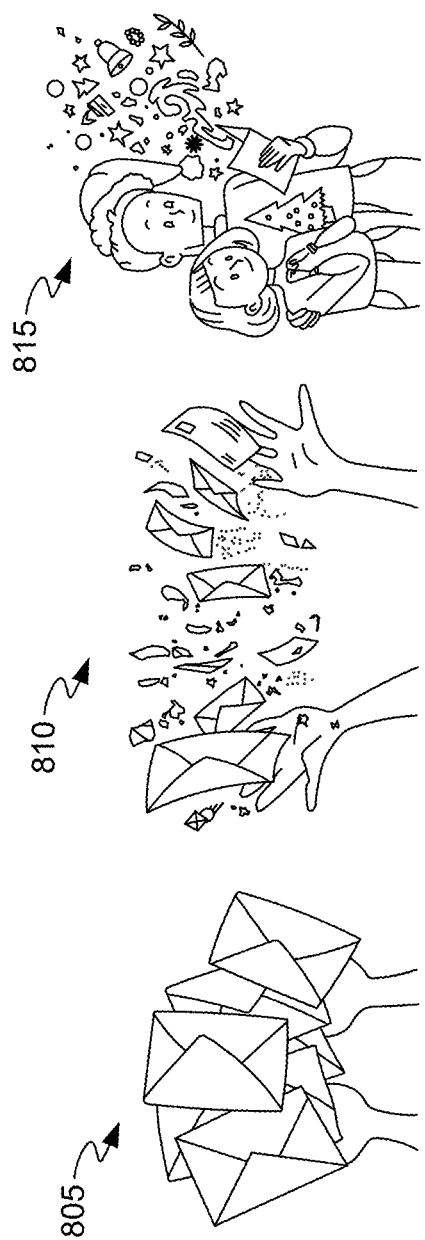
FIG. 8 is a diagram illustrating a graphical encouragement for using activatable postage, in accordance with an aspect of the technology.

Further, each card sent could be represented through a digital "badge" or "sticker" and as the sender makes these connections, "stickers" can accumulate in a digital archive that can then be revisited as a reminder of the relationship and occasion, as depicted in FIG. 6. As the sender sends greeting cards to people, the caring reach of his or her arms could grow to encompass more people and/or places, as depicted in FIG. 7, below right.

The feelings of warmth, love, support, encouragement, etc. can be represented through environmental icons and the sender's impact on their recipient and/or the region could be shown in the app through a visual spreading of those icons.

From the foregoing it will be seen that technology described herein is well adapted to attain all ends and objects hereinabove set forth together with the other advantages which are obvious and which are inherent to the method and apparatus. It will be understood that certain features and subcombinations are of utility and may be employed without reference to other features and subcombinations. For example, while the examples above talk about the barcode/alternative postage being printed on an envelope, the technology described herein is not limited to such a use. For example, the barcodes may be printed on sheets of labels or packages of labels. Consumers may purchase the labels to apply them to standard blank envelopes or to parcels/packages. The barcode on the label may be used in the same manner as above.

Further, multiple couriers may all be provided access to the database and collect their share of revenues from the postage collected for the packages they deliver. For example, at the start of the app, the user may be provided with a list of all of the couriers available for use through the alternative postage. In one instance the user may select a local messenger to deliver documents to another building. When that option is selected, the user may be asked to enter information specific to that courier and that type of delivery (e.g., pickup time, delivery deadline, etc.). Certain selected couriers may even be able to be notified by the app of a pickup and may be able to notify the sender through the app that they are almost at the pickup location. Once that service scans the barcode on the label, the fees collected to activate that barcode for the service are associated with that courier. In this manner the barcodes on the labels may be used for many different services from many different service providers. These modifications and others are contemplated by and is within the scope of the technology described herein.

Figure 9:
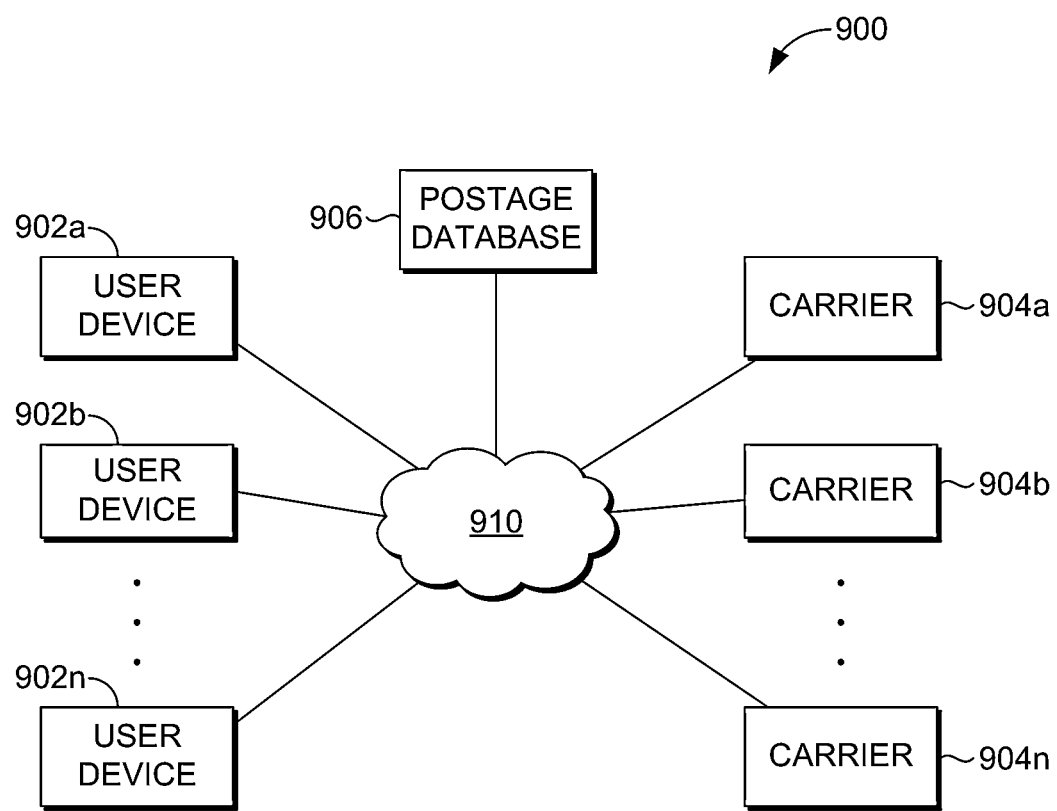
FIG. 9 is a block diagram of an example operating environment suitable for implementing aspects of the technology.

Turning now to FIG. 9, a block diagram is provided showing an operating environment 900 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 900 includes a number of user devices, such as user devices 902a and 902b through 902n; a number of carrier locations, such as carriers 904a and 904b through 904n; postage server 906; and network 910. It should be understood that environment 900 shown in FIG. 9 is an example of one suitable operating environment. Each of the components shown in FIG. 9 may be implemented via any type of computing device, such as computing device 1400, described in connection to FIG. 14, for example. These components may communicate with each other via network 910, which may include, without limitation, one or more local area networks (LANs) and/or wide area networks (WANs). In exemplary implementations, network 910 comprises the Internet and/or a cellular network, amongst any of a variety of possible public and/or private networks.

It should be understood that any number of user devices, servers, and carrier locations may be employed within operating environment 900 within the scope of the present disclosure. Each may comprise a single device or multiple devices cooperating in a distributed environment. For instance, postage server 906 may be provided via multiple devices arranged in a distributed environment that collectively provide the functionality described herein. As an example, the postage server 906 may be a group of servers located at one or more different data centers. Additionally, other components not shown may also be included within the distributed environment.

User devices 902a and 902b through 902n can be client devices on the client-side of operating environment 900, while postage service 906 can be on the server-side of operating environment 900. Postage service 906 can comprise server-side software designed to work in conjunction with client-side software on user devices 902a and 902b through 902n so as to implement any combination of the features and functionalities discussed in the present disclosure. This division of operating environment 900 is provided to illustrate one example of a suitable environment, and there is no requirement for each implementation that any combination of postage service 906 and user devices 902a and 902b through 902n remain as separate entities.

User devices 902a and 902b through 902n may comprise any type of computing device capable of use by a user. The user devices may be personal devices, such as phones, tablets, or laptops or public devices, such as a computer associated with a postage activation kiosk. For example, in one aspect, user devices 902a through 902n may be the type of computing device described in relation to FIG. 14 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where postage may be activated.

Carrier locations 904a and 904b through 904n may comprise physical facilities for receiving and processing postal items, such as letters and packages. For example, a post office is an example of a single carrier location. The carrier location can include mechanical sorting equipment and postal processing equipment that validates the activatable postage and then routes the item associated with the activatable postage to its destination, possibly a second carrier location. The carrier locations can comprise computing systems that connect to the postage service 906.

The postage service 906 manages a database that tracks the status of activatable postage. Initially, the database can be populated with a plurality of activatable postage records. Each record can comprise a unique identifier associated with a single instance of activatable postage. Other fields in the record can include a status field that can be either activated or deactivated, a postage value associated with the record, the destination ZIP Code, date of activation, date of deactivation, and the like. The postage service 906 may be implemented across a series of servers in multiple data centers. The postage service 906 interfaces with user devices in order to activate individual instances of activatable postage. The postage service 906 also interfaces with carrier locations in order to deactivate individual instances of activatable postage. The postage service 906 can also interface with different payment systems, as needed.

Figure 10:
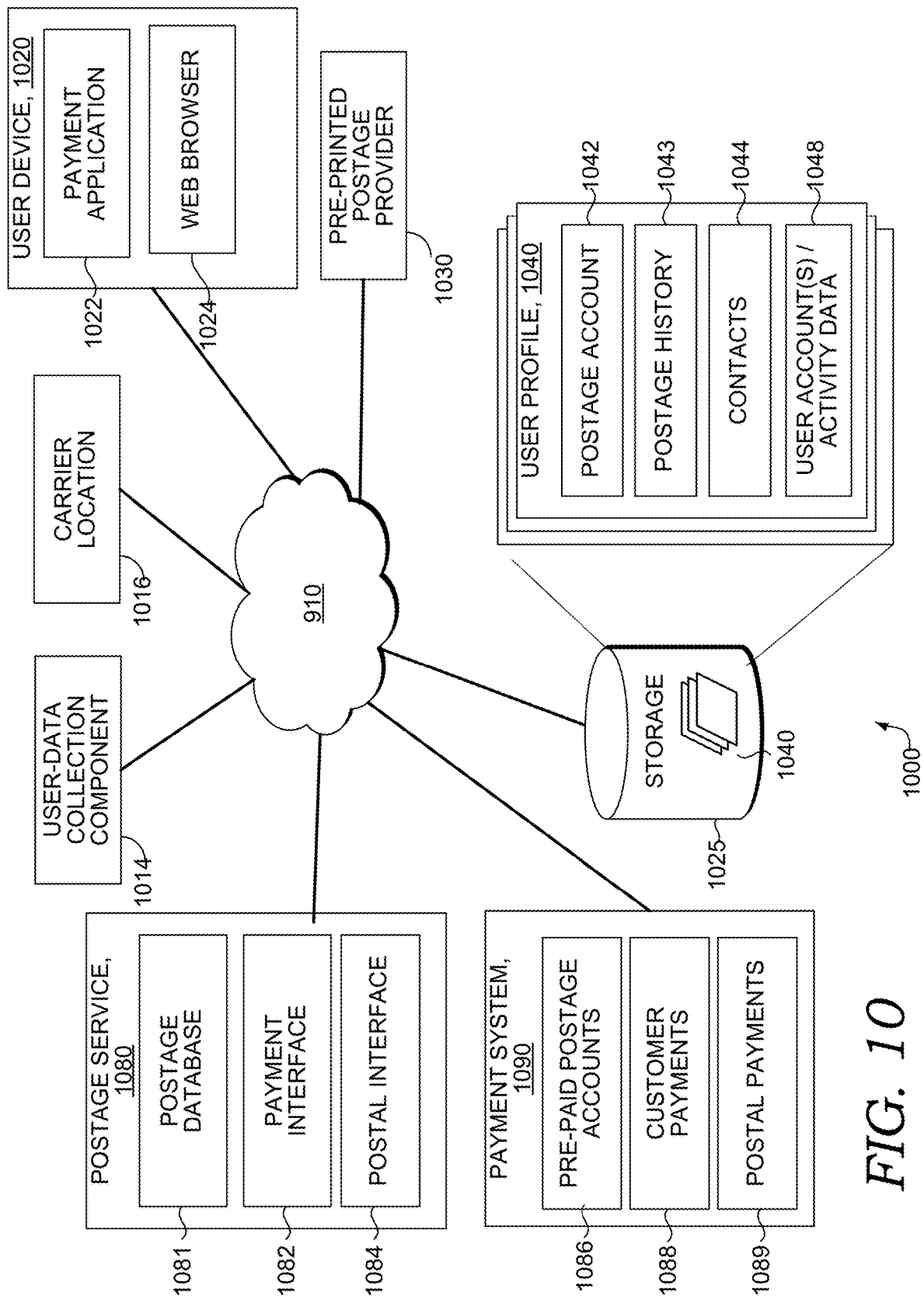
FIG. 10 is a diagram depicting an example computing architecture suitable for implementing aspects of the technology.

Operating environment 900 can be utilized to implement one or more of the components of system 1000, described in FIG. 10, including components for collecting user data, monitoring communication events, generating modified notifications, and/or presenting notifications and related content to users.

Referring now to FIG. 10, with FIG. 10, a block diagram is provided showing aspects of an example computing system architecture suitable for implementing an aspect of the technology and designated generally as system 1000. System 1000 represents only one example of a suitable computing system architecture. Other arrangements and elements can be used in addition to or instead of those shown, and some elements may be omitted altogether for the sake of clarity. Further, as with operating environment 900, many of the elements described herein are functional entities that may be implemented as discrete or distributed components or in conjunction with other components, and in any suitable combination and location.

Example system 1000 includes network 910, which is described in connection to FIG. 9, and which communicatively couples components of system 1000 including user-data collection component 1014, carrier location 1016, user device 1020, activatable postage provider 1030, activatable postage service 1080, payment system 1090, and storage 1025. Activatable postage service 1080 (including its components 1081, 1082, and 1083), user-data collection component 1014, and payment system 1090 (including its components 1086, 1088, and 1089) may be embodied as a set of compiled computer instructions or functions, program modules, computer software services, or an arrangement of processes carried out on one or more computer systems, such as computing device 1400 described in connection to FIG. 14, for example.

In one aspect, the functions performed by components of system 1000 are associated with one or more personal assistant applications, services, or routines. In particular, such applications, services, or routines may operate on one or more user devices (such as user device 902*a*), servers (such as server 906), may be distributed across one or more user devices and servers, or be implemented in the cloud. Moreover, in some aspects, these components of system 1000 may be distributed across a network, including one or more servers (such as server 906) and client devices (such as user device 902*a*), in the cloud, or may reside on a user device such as user device 902*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 10, user-data collection component 1014 is generally responsible for accessing or receiving (and in some cases also identifying) user data from one or more data sources. The user data can include a history of postage purchases, destination information, product purchases, account information, social network information, payment information, and other information related to activatable postage. In some aspects, user-data collection component 1014 may be employed to facilitate the accumulation of user data of one or more users for the activatable postage service 1080. The data may be received (or accessed), and optionally accumulated, reformatted, and/or combined, and stored in one or more data stores such as storage 1025, where it may be available to activatable postage service 1080. For example, the user data may be stored in or associated with a user profile 1040, as described herein.

The user profile 1040, is stored in a variety of information gleaned from a user's purchase of activatable postage, postage activity, purchase activity, and other related activity. The user may be provided opt in or opt out interface where the information being stored in a user profile is explained to the user. The user may be given the option to exclude various data sources or data from the user profile. The user may be given the option to delete existing records, correct information, and provide feedback about the information in the user profile.

The user information can include details about a postage account 1042. Postage account 1042 helps facilitate activation of postage. The postage account 1042 may comprise a user ID and password. The postage account 1042 can also be associated with various payment methods. The postage account 1042 can include unique identifiers for different user devices. Information such as a home address, work address, application versions, email addresses, phone numbers, and the like may also be stored in the postage account 1042.

The postage account 1042 can facilitate a prepaid activatable postage account. The user may pay in advance for an amount of postage. In this scenario, the postal value assigned to activatable postage is debited from the prepaid account upon activation. The user may receive notices when the account value passes below a threshold. The user may be given the option of replenishing the account through the activation application when an activatable postage instance is being activated and the prepaid account falls below a threshold.

The postage history 1043 stores a record of postage purchased, destinations the purchased postage was used to send items to, and any other information about the user's use or purchase of activatable postage.

The contacts record 1044 may comprise a contacts record accessible to an activation application residing on a user device. In one instance, the user gives the activation application permission to access the contacts on the user device. In another instance, the contacts 1044 are from a separate source, such as the destination addresses used on activatable postage. The contacts 1044 can include social media contacts, work contacts, or other contacts affiliated with the user.

The user accounts activity data 1048 provides information about one or more separate accounts, such as email or social media accounts. In one aspect, a user is able to authenticate himself to the activation system using social media credentials. If the user selects this authentication method, then the credentials may be associated with the user profile 1040.

The activatable postage provider 1030 can provide activatable postage in a number of formats. In one aspect, the activatable postage provider 1030 is an entity that prints activatable postage on envelopes, stickers, or other media. A postage provider 1030 can contract with one or more carriers for the activatable postage to be valid. Unlike stamps, the activatable postage could be accepted by multiple carriers. Multiple carriers could access the activatable postage service 1080 and receive compensation by validating and deactivating an instance of activatable postage.

The activatable postage provider 1030 can also provide an activation application 1022 and the payment system 1090. Further, the activatable postage service 1080 can be set up and run by the activatable postage provider 1030. The activatable postage provider 1030 can take an interest in individual transactions. For example, the activatable postage provider 1030 can agree to make up the difference between a postage value assigned to an activatable postage instance and a calculated postage rate charged by the carrier for the item associated with the instance. Similarly, the activatable postage provider 1030 can manage the user profiles 1040, in other aspects of the system.

Figure 11:
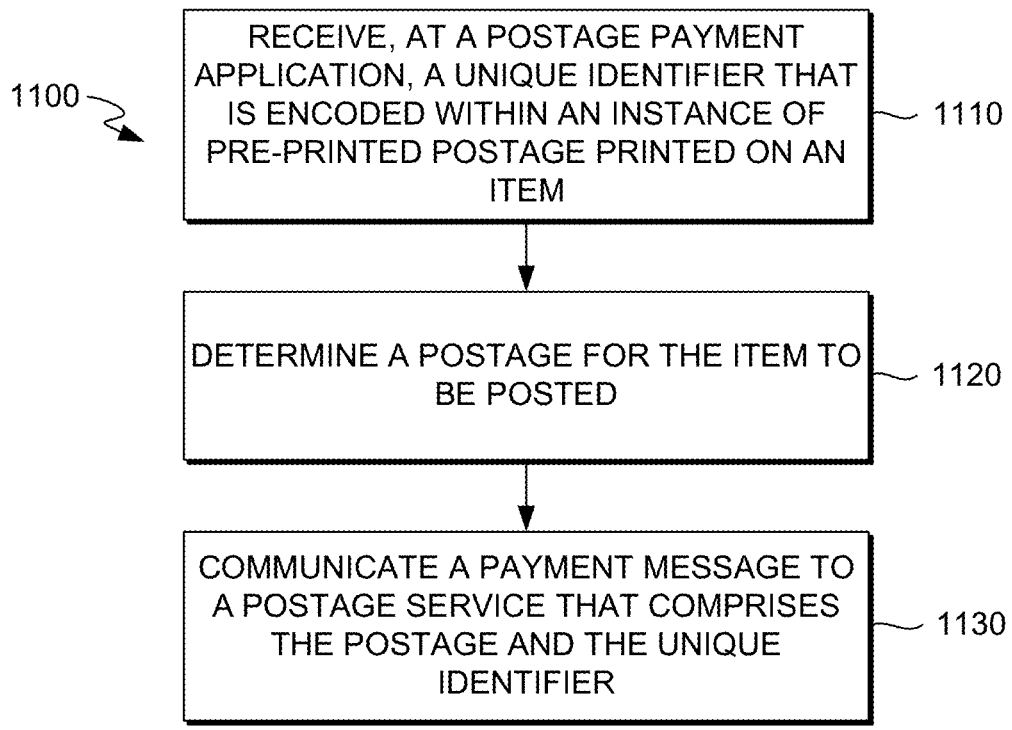
FIG. 11 depicts a flow diagram of a method for activating pre-printed postage, in accordance with an aspect of the technology.

The user device 1020 comprises an activation application 1022 and a web browser 1024 among many other components not shown. The user device 1022 can be similar to the user devices 902*a* described previously with reference to FIG. 9. Both the activation application 1022 and the web browser 1024 may be used to activate postage through the user device 1020. In either instance, aspects of the activation process may be performed by components operating a computing devices apart from the user device 1020. FIG. 11 describes a postage activation method that could be performed by the user device 1020.

Turning now to FIG. 11, a method 1100 for of activating postage from a computing device is provided. The computing device may be a user device, such as described previously reference to user device 1020. The activation process of method 1100 may utilize an activation application running on a computing device. The activation process may use a web browser or other application to access a web page through which the postage may be activated according to the steps described below. In one aspect, the computing device is a user device such as a smart phone, PC, or tablet. In another aspect, the computing device is part of a kiosk provided in a public location, such as a post office or store. In one aspect, an activation kiosk is provided within or nearby a stationary section of a drug store, grocery store, or other store where greeting cards and other stationary may be purchased.

Initially, the user may gain access to an activation application. In one example, the user downloads and installs an activation application on his or her user device. In another aspect, the user accesses an application through a webpage. In yet another example, the user accesses an activation application at a publicly available computing device. The activation application may ask the user to login with credentials and follow an authentication process. As part of this process user information may need to be provided as described previously.

The activation application can guide the user through the activation process with tips or prompts for various steps displayed through a graphical user interface. Initially, the user may be prompted to scan the activatable postage the user wants to activate. The user can scan the activatable postage using the camera on the user device. The user interface may show a camera view in a portion of the screen to help the user see where the camera is pointed. Once an adequate image is captured, the user may be informed the scanning process is complete.

At a minimum, the activatable postage comprises unique identifier encoded in a machine-readable format, such as a QR code. As mentioned, the activatable postage may be affixed to an envelope or other item. The activatable postage could be printed on a sticker that can in turn be affixed to the item to be posted. The activatable postage may also have a human readable alphanumeric string to help the user differentiate between different instances of activatable postage. The human readable alphanumeric string may be related to the unique identifier or completely separate. For example, the string could be the last five characters of the unique string. Activatable postage may also comprise a watermark or other security mark to help prevent forgeries.

At step 1110, a unique identifier that is encoded within an instance of activatable postage printed on an item is received at a postage activation application. In order to activate an individual instance of activatable postage, the unique identifier encoded in the activatable postage needs to be provided to the activation application. In one aspect, the unique identifier is retrieved by scanning the activatable postage. For example, the camera on a smart phone may capture an image of the activatable postage. The image can be provided by the camera to the activation application which decodes the unique identifier from the machine-readable format in which it is encoded. In another aspect, a decoding utility on the phone is accessed by the activation application to decode the unique identifier.

At step 1120, a postage rate required for the item to be posted is determined. The user can be prompted to provide information about the item to be posted in order to calculate the postage rate. The information can include a size and weight of the item. Alternatively, the activation application can provide examples for the user to select in order to estimate a size and weight. For example, a user can be asked to select images of envelopes having different sizes with different amounts of paper in each envelope. Every size combination does not need to be provided, instead representative sizes and amounts of paper can be used to estimate the appropriate postage rate for the item.

In one aspect, a UPC label on a greeting card or other commercial product may be scanned to retrieve a size and weight of the item. The activation application may prompt the user to scan the UPC label on greeting card or other item. The activation application may look up information about a commercial product from a database. The activation application may use a backend service to perform this function. Alternatively, the activation application may have a local record of some UPC labels and corresponding postal information. The user may also be asked to provide a destination address. In one aspect, the activation application includes the ability to read handwriting. In this instance, the destination address could be obtained by scanning the address listed on the item. In another aspect, an address can be selected from the user's contact information. User may be transferred to a contact interface on the user device in order to select a contact and corresponding address. The user may be asked to select different postal options, such as first-class mail, express shipping, next day delivery, media mail, or some other option.

Once the item information is provided and postal options selected, the postage rate is calculated. The user may be asked to confirm the amount or authorize payment in the amount of the calculated postage rate. A postal value equal to the postage rate will then be associated with the activatable postage.

At step 1130, an activation message is communicated to an activatable-postage service. The activation message comprises a postage value equal to the postage rate and the unique identifier. Once confirmation is obtained, the application sends a message to a central postage service. The service updates a central database to associate the unique identifier with a postal value equal to the postage rate. Other information may also be included within the message, such as a destination ZIP Code and user ID of the user activating the postage.

In the event of a miscalculation of the postage rate, the user may pre-authorize the central postage service to charge the user a difference between the postage rate and a postage rate subsequently calculated by the carrier.

Returning to FIG. 10, payment for the postage value assigned to an activatable postage instance can be processed by the payment system 1090. In one aspect, user's for entities such as companies, pay advance to create a pre-paid postage account. These accounts are managed by the pre-paid account component 1086. The prepaid postage account component and a six canned track the balance in various accounts and provide balance updates to users.

The customer payment component 1088 is responsible for receiving funds from customers activating postage. The customer payments component 1088 can receive payment from credit cards and other payment methods. The customer payment component 1088 can control the timing of customer payments. In one aspect, customer charges on a credit card are accumulated for an hour, day or some other time and passed along as a group. In one aspect, charges are accumulated so long as an active application session is ongoing. An active application session may be ongoing when the activation is open and continues to receive input without an interruption lasting longer than a threshold duration, such as five minutes. At the conclusion of the activation session, the sum of all postage values added to activatable postage during the session are charged as a lump sum to the user's credit card or payment method.

The postal payments component 1089 is responsible for transferring funds to a carrier that received an item posted using activatable postage. In one aspect, funds are transferred to the postal payment component 1089 upon activation of an instance of activatable postage. In another instance, funds are transferred to the carrier on the carrier providing a deactivation message to the activatable postage service 1080.

Returning to FIG. 10, the activatable postage service 1080 comprises a postage database 1081, an activation interface 1082, and a postal interface 1084. The postage database 1081 include records for individual instances of activatable postage. The information included in each record can vary, but exemplary information includes the unique identifier associated with the instance of activatable postage, postage amount associated with the record, and active/deactive status, a date postage was added to the record, a date postage was deactivated, carrier identification, carrier location identification, destination information, and user identification information. The activation interface 1082 helps facilitate the activation process for interfacing with an activation application, such as activation application 1022. The activation interface 1082 can receive an activation instruction and provide an instruction to update the postage database 1081 according to the activation instruction. The postal interface 1084 communicates with the carrier location 1016. The activatable postage service 1080 contract and update the activation status of activatable postage, as described with reference to FIG. 12.

Figure 12:
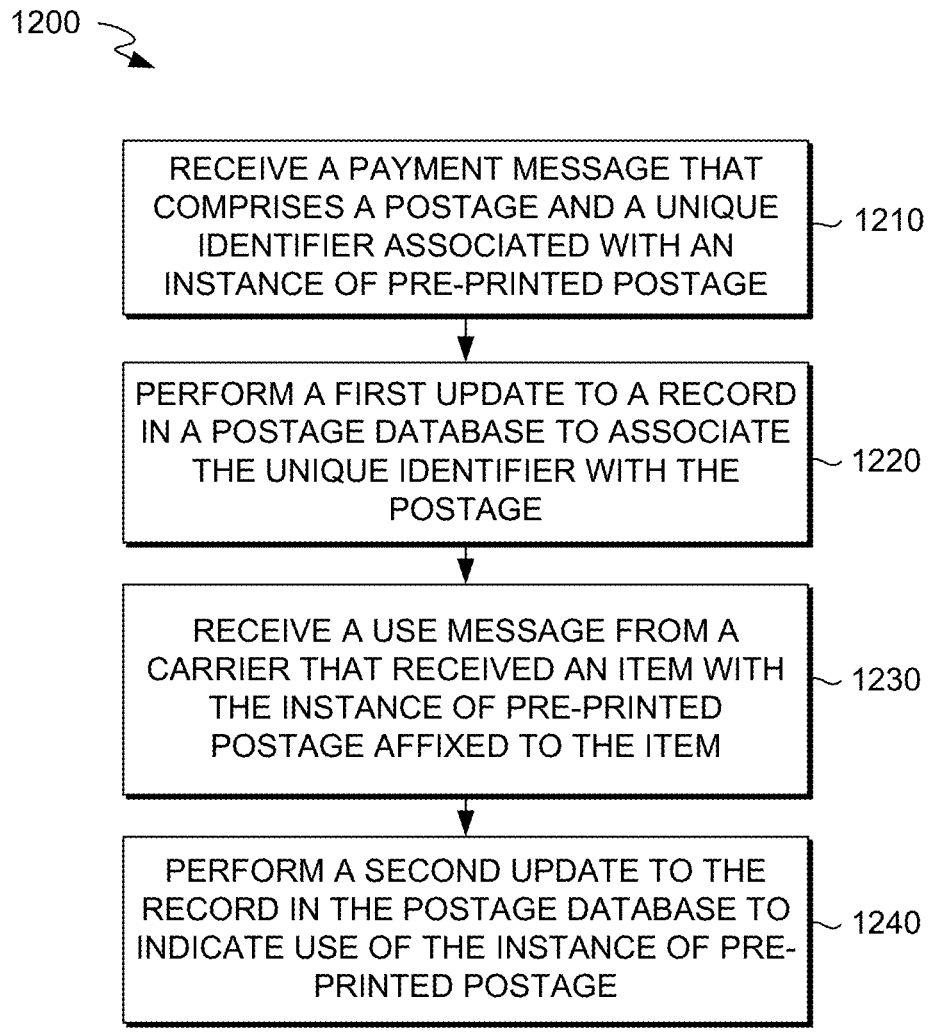
FIG. 12 depicts a flow diagram of a method for processing and deactivating activatable postage, in accordance with an aspect of the technology.

Turning now to FIG. 12, a method 1200 for tracking an activation status of activatable postage is provided. At step 1210, an activation message that comprises a postage value and a unique identifier associated with an instance of activatable postage is received. The activation message may be received from an activation application. The postage value may be calculated by the activation application for a particular item to which activatable postage is attached. The unique identifier will correspond with the activatable postage attached to the item.

At step 1220, a first update is performed on a record in an activatable-postage database to associate the unique identifier with the postage value. Other information may be updated, such as the date of activation, the user associated with the activation, and activation entity responsible for the activatable postage, and the like.

At step 1230, a deactivation message is received from a carrier that received an item with the instance of activatable postage affixed to the item.

At step 1240, a second update is performed on the record in the activatable-postage database to deactivate the instance of activatable postage. The field maybe provided to describe the activation status of the activatable postage instance. Once deactivated, the activatable postage instance will not be usable the second time without reactivation by going through the reactivation process a second time.

Figure 13:
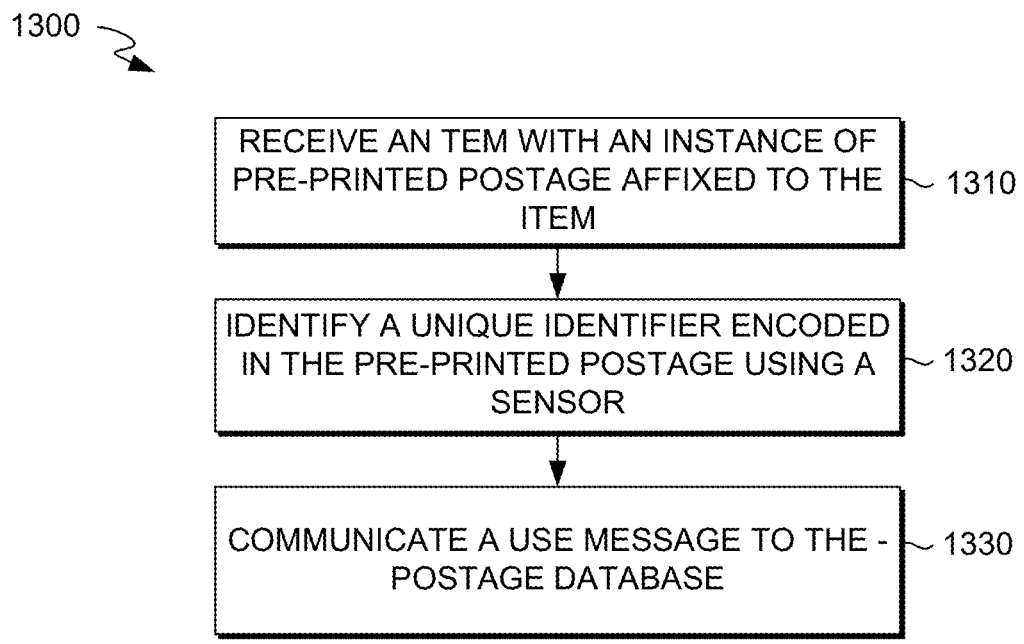
FIG. 13 depicts a flow diagram of a method for printing activatable postage, in accordance with an aspect of the technology.

Returning to FIG. 10, the carrier location 1016 can be similar to the carrier locations described previously with reference to FIG. 9. For example, the carrier location 1016 can be post office. The carrier location 1016 is responsible for receiving and processing items that are posted using activatable postage. As part of the processing, the carrier location 1016 and validate activatable and then deactivated it by communicating with the activatable postage service 1080. FIG. 13 describes a method for validating and deactivating postage that may be performed by the carrier location 1016.

Turning now to FIG. 13, a method 1300 of processing activatable postage is provided. When the Postal Service receives an item with activatable postage it validates the activatable postage and then deactivates the activatable postage.

At step 1310, an item is received with an instance of activatable postage affixed to the item. The carrier location, such as a post office, can use automated machinery to process and route items. In one aspect, items having activatable postage are identified by scanning the postage on the items. Different types of postage may be processed different ways. Once identified, the activatable postage is validated. Validating the postage comprises identifying a postage value currently associated with the activatable postage and comparing it to a calculated postage rate for the item.

At step 1320, a unique identifier encoded in the activatable postage is identified using a sensor. The unique identifier may be extracted by scanning the activatable postage and providing the information obtained to a decoding utility. As mentioned previously, the unique identifier may be encoded as a QR code, barcode, or in some other machine readable format. The scanning method employed is suitable for the encoding method used.

At step 1330, a correct postage rate is calculated for the item. The correct postage may be calculated according to a size and weight of the item, postage class, delivery location, and other factors. The correct postage rate may be calculated at any point in the process prior to the comparison of the correct postage rate with the postage value associated with the activatable postage.

At step 1340, a request is communicated to an activatable-postage service for a postage value associated with the unique identifier. The request can take any number of forms. In one aspect, and asynchronous queue-based communication is set up between the carrier location and activatable postage service. This system allows an open channel of communications to be maintained. When activated postage needs validation, a request is communicated to a queue in the activatable-postage service. The service then processes the request and provides a response by looking up the requested information in an activatable postage database. In general, a request for the associated postage value only requires the unique identifier, but can include different information. The request itself may include a request ID that is used to respond to the specific request.

At step 1350, the postage value is received from the activatable-postage service. The postage value may be returned in a response message.

At step 1360, the postage value is compared to the correct postage rate. Various actions can be taken based on comparison. In the simplest case when the postage value is greater than or equal to the postage rate, the item is processed and routed to its destination. Various things can occur when the postage value is less than the postage rate. In one case, the carrier can handle the item as it would handle any other item with adequate postage. For example, the post office could ask for the recipient to supply the difference between the calculated rate and the postage value.

In one aspect, aspects of the technology allow postage value associated with unique identifier to be adjusted upwards to match the calculated rate. As mentioned, the user may preauthorize the application interface and corresponding service to debit the user in the amount of any postage shortfall. Alternatively, an entity providing the activatable postage may take on responsibility for the shortfall itself. In either case, a message can be communicated to the activatable postage service 1080 requesting additional funds to make up the difference. When a system is place to adjust the shortfall either by charging the user the entity activating the postage then an updated postage value may be provided in the exact amount of the calculated rate. The validation process can then restart using the updated postage value.

At step 1370, a deactivation message is communicated to the activatable-postage service. Once the carrier has processed the item and validated the activatable postage, a message to deactivate the postage is provided. The message can include the unique identifier as well as relevant information, such as the calculated rate. The calculated rate can act as feedback that helps the activation application improve the postage rate estimates that provides users. The deactivation message can include identification of the carrier location. In an aspect, the activatable postage service 1080 can interface with multiple carriers. Carriers may receive compensation in the amount of the calculated postage rate upon receiving a deactivation message.

Figure 14:
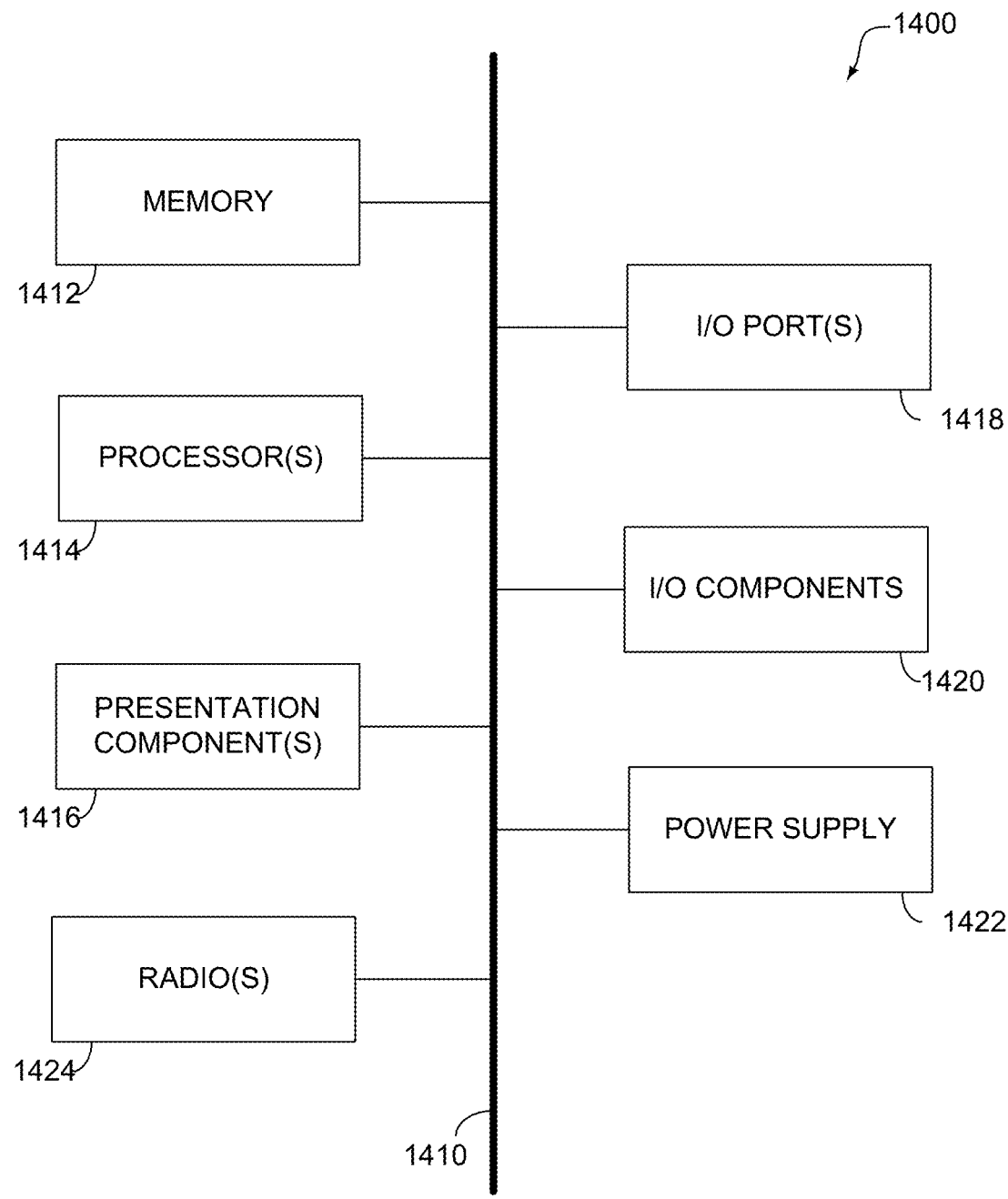
FIG. 14 is a block diagram of an exemplary computing environment suitable for use in implementing an aspect of the technology.

With reference to FIG. 14, computing device 1400 includes a bus 1410 that directly or indirectly couples the following devices: memory 1412, one or more processors 1414, one or more presentation components 1416, one or more input/output (I/O) ports 1418, one or more I/O components 1420, and an illustrative power supply 1422. Bus 1410 represents what may be one or more busses (such as an address bus, data bus, or combination thereof). Although the various blocks of FIG. 14 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 14 is merely illustrative of an exemplary computing device that can be used in connection with one or more aspects of the present technology. Distinction is not made between such categories as "workstation," "server," "laptop," "handheld device," etc., as all are contemplated within the scope of FIG. 14 and with reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors 1414 that read data from various entities such as memory 1412 or I/O components 1420. Presentation component(s) 1416 presents data indications to a user or other device. Exemplary presentation components include a display device, speaker, printing component, vibrating component, and the like.

The I/O ports 1418 allow computing device 1400 to be logically coupled to other devices, including I/O components 1420, some of which may be built in. Illustrative components include a microphone, joystick, game pad, satellite dish, scanner, printer, wireless device, etc.

The I/O components 1420 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1400. The computing device 1400 may be equipped with depth cameras, such as stereoscopic camera systems, infrared camera systems, RGB camera systems, and combinations of these, for gesture detection and recognition. Additionally, the computing device 1400 may be equipped with accelerometers or gyroscopes that enable detection of motion. The output of the accelerometers or gyroscopes may be provided to the display of the computing device 1400 to render immersive augmented reality or virtual reality.

Some aspects of computing device 1400 may include one or more radio(s) 1424 (or similar wireless communication components). The radio 1424 transmits and receives radio or wireless communications. The computing device 1400 may be a wireless terminal adapted to receive communications and media over various wireless networks. Computing device 1400 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A package-delivery system, comprising:
a plurality of packaging items that each include machine-readable code that is encoded to (1) launch a postage-activation application that is present on a mobile device or, when not present, to present application-identification information that is usable to identify the postage-activation application, and (2) serve as activatable postage; and
one or more computer-storage media comprising instructions embodied thereon that, when executed by at least one processor of a remote computing device, cause the mobile computing device to perform a method comprising:
scanning a first instance of the machine-readable code that is on one of the plurality of packaging items;
launching an instance a postage-activation application in response to the scanning;
determining, via the postage-activation application, a unique identifier associated with the machine-readable code, where the unique identifier is associated with a first record in an activatable-postage database;
presenting, via the instance of the postage-activation application, instructions to scan a Universal Product Code ("UPC") barcode of an item to be mailed in the packaging item, thereby providing for the determination of UPC information sufficient to identify the item to be mailed;
communicating the UPC information to a products database to lookup physical information about the item;
receiving physical information about the item;
presenting an option to receive additional postage-related information;
based on the physical information and the additional postage-related information, determining a postage value to mail the item;
receiving payment information equal to at least the postage value; and
communicating an activation indication to the first record in the activatable -postage database such that the postage associated with the unique identifier is transitioned to an activated state, thereby enabling the item to be mailed via the packaging item and further enabling a centralized postage service to determine that the packaging item is authorized to be mailed.

2. The system of claim 1, wherein the machine-readable code that is included on the packaging items is printed directly on the packaging item or is included as a sticker on the packaging item.

3. The system of claim 1, wherein the machine-readable code includes two embedded codes: a first code that is usable to launch or identify the postage-activation application and a second code that is useable to identify an instance of activatable-postage.

4. The system of claim 1, wherein scanning said first instance of the machine-readable code includes receiving an image of the machine-readable code via a camera of the remote computing device.

5. The system of claim 1, wherein the barcode includes a QR code.

6. The system of claim 1, further comprising
outputting for display on an interface seeking an indication as to whether a gift card is included within the packaging item;
receiving an input indicating that a gift card is included in the packaging item; and
using an estimated weight of the gift card when determining a postage rate.

7. The system of claim 1, further comprising:
outputting for display on an interface seeking user input to indicate an amount of printed photographs included within the packaging item;
receiving an input indicating the amount; and
using an estimated weight of the amount of printed photographs when determining a postage rate.

8. The system of claim 1, wherein the presenting includes presenting a link to download an instance of the postage-activation application.

9. The system of claim 1, wherein the first record in the activatable-postage database includes indicating whether that instance of activable postage is one or more of the following states: used, cancelled, activated, deactivated, processed, or void.

10. The system of claim 1, wherein the products database includes product-related information corresponding to the product identified by the UPC information.

11. The system of claim 1, wherein the additional postage-related information includes one or more of the following:
a modified quantity of the item to be mailed;
geographic-location information;
adjusted dimensions of the item of be mailed; or
a requested delivery time to be met.

12. The system of claim 11, wherein the geographic-location information includes destination information.

13. The system of claim 1, further comprising presenting a visualization of item-sending data, including a pictorial visualization that is consistent with a theme of the postage-activation application.

14. The system of claim 13, wherein the pictorial visualization takes the form of a digital tree with leaves, wherein each leaf represents a card sent to a recipient.

15. One or more computer-storage media comprising instructions embodied thereon that, when executed by at least one processor of a computing device, cause the mobile computing device to perform a method comprising:
receiving a digital image of a first instance of a machine-readable code that is embodied on one of a plurality of items that each include machine-readable code that is encoded to (1) launch a postage-activation application that is present on a mobile device or, when not present, to present application-identification information that is usable to identify the postage-activation application, and (2) serve as activatable postage;
launching an instance a postage-activation application in response to the scanning;
determining, via the postage-activation application, a unique identifier associated with the machine-readable code, where the unique identifier is associated with a first record in an activatable-postage database;

presenting, via the instance of the postage-activation application, instructions to scan a Universal Product Code ("UPC") barcode of said item, thereby determining UPC information sufficient to identify the item to be mailed;

communicating the UPC information to a products database to retrieve physical information about the item;

receiving physical information about the item;

presenting an option to receive additional postage-related information;

based on the physical information and the additional postage-related information, determining a postage value necessary to mail the item;

receiving payment information equal to at least the postage value; and communicating an activation indication to the first record in the activatable-postage database such that the postage associated with the unique identifier is transitioned to an activated state, thereby enabling the item to be mailed and further enabling a centralized postage service to determine that the item is authorized to be mailed.

16. The media of claim 15, wherein the machine-readable code includes two embedded codes: a first code that is usable to launch or identify the postage-activation application and a second code that is useable to identify an instance of activatable-postage.

17. The media of claim 16, wherein the scanning of the first instance of the machine-readable code includes receiving an image of the machine-readable code via a camera of the remote computing device.

18. The media of claim 17, wherein said barcode includes a QR code.

19. The media of claim 18, further comprising:
outputting for display on an interface seeking an indication as to whether a gift card is included with the item or is the item;
receiving an input indicating that a gift card is included; and
using an estimated weight of the gift card when determining the postage rate.

20. The media of claim 19, further comprising:
outputting for display an interface asking the user to indicate an amount of printed photographs included;
receiving an input indicating the amount; and
using an estimated weight of the amount of printed photographs when determining the postage rate.

* * * * *